US008921438B2

(12) United States Patent
Cao et al.

(10) Patent No.: US 8,921,438 B2

(45) Date of Patent: Dec. 30, 2014

(54) POLYETHERIMIDE POLYCARBONATE BLENDS

(71) Applicant: Sabic Innovative Plastics IP B.V., Bergen op Zoom (NL)

(72) Inventors: Feng Cao, Loudonville, NY (US); Aditya Narayan, Mt. Vernon, IN (US); Kapil Sheth, Evansville, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 13/795,210

(22) Filed: Mar. 12, 2013

(65) Prior Publication Data

US 2013/0261202 A1 Oct. 3, 2013

Related U.S. Application Data

(60) Provisional application No. 61/616,839, filed on Mar. 28, 2012.

(51) Int. Cl.

| | |
|---|---|
| ***C08L 79/08*** | (2006.01) |
| ***C08L 83/04*** | (2006.01) |
| ***C08L 69/00*** | (2006.01) |
| ***C08G 73/10*** | (2006.01) |

(52) U.S. Cl.

CPC ............... *C08L 79/08* (2013.01); *C08G 73/106* (2013.01); *C08G 73/1046* (2013.01); *C08L 83/04* (2013.01); *C08L 69/00* (2013.01)

USPC ............. 521/154; 524/91; 524/147; 264/478; 264/494

(58) Field of Classification Search

CPC .......... C08L 79/08; C08L 69/00; C08L 83/04

See application file for complete search history.

(56) References Cited

U.S. PATENT DOCUMENTS

| | | | | |
|---|---|---|---|---|
| 3,405,042 | A | 10/1968 | Neunzig | |
| 3,616,310 | A | 10/1971 | Dorsey, Jr. | |
| 4,548,997 | A | 10/1985 | Mellinger et al. | |
| 4,629,759 | A | 12/1986 | Rock | |
| 4,673,708 | A | 6/1987 | Rock et al. | |
| 4,816,527 | A * | 3/1989 | Rock | 525/431 |
| 5,051,483 | A | 9/1991 | Rock et al. | |
| 5,106,915 | A | 4/1992 | Rock et al. | |
| 5,229,482 | A | 7/1993 | Brunelle | |
| 5,385,970 | A * | 1/1995 | Gallucci et al. | 524/538 |
| 5,387,639 | A * | 2/1995 | Sybert et al. | 524/537 |
| 6,011,122 | A | 1/2000 | Puyenbroek | |
| 6,310,145 | B1 | 10/2001 | Puyenbroek et al. | |
| 7,390,450 | B2 * | 6/2008 | Hoeks et al. | 264/171.13 |
| 7,452,944 | B2 | 11/2008 | Gallucci et al. | |
| 7,695,815 | B2 * | 4/2010 | Agarwal et al. | 428/412 |
| 2001/0031804 | A1 * | 10/2001 | Shakhnovich | 524/86 |
| 2002/0025999 | A1 * | 2/2002 | Shakhnovich | 524/86 |
| 2004/0232598 | A1 * | 11/2004 | Donea et al. | 264/322 |
| 2005/0260369 | A1 * | 11/2005 | Graf et al. | 428/35.7 |
| 2006/0247338 | A1 * | 11/2006 | Klei et al. | 524/89 |
| 2009/0306258 | A1 * | 12/2009 | Siripurapu et al. | 524/147 |
| 2010/0222474 | A1 * | 9/2010 | Irie et al. | 524/106 |

FOREIGN PATENT DOCUMENTS

| | | |
|---|---|---|
| EP | 0519657 | 12/1992 |
| WO | WO 94/10245 | 5/1994 |
| WO | WO 2006/065560 | 6/2006 |

OTHER PUBLICATIONS

International Search Report dated Jul. 9, 2013.

Written Opinion of the International Searching Authority.

* cited by examiner

*Primary Examiner* — Robert S Loewe

(74) *Attorney, Agent, or Firm* — Novak Druce Connolly Bove + Quigg LLP

(57) ABSTRACT

The disclosure relates to compositions exhibiting a UV resistance of ΔE ranging from more than 0 to less than or equal to 10 units after exposure to ultraviolet light for 300 hours, per ASTM D-4459 protocol. The compositions can include at least 15 wt. % of a polyetherimide; at least 35 wt. % of a polycarbonate; a polyetherimide siloxane; and optionally, at least one UV stabilizer. The disclosure also relates to methods of shaping such compositions and articles produced from such compositions.

50 Claims, No Drawings

POLYETHERIMIDE POLYCARBONATE BLENDS

CROSS REFERENCE TO RELATED APPLICATIONS

This application is a Non-Provisional of U.S. Application Ser. No. 61/616,839, having been filed on Mar. 28, 2012, herein incorporated by reference in its entirety.

BACKGROUND OF THE INVENTION

High heat thermoplastics such as polyetherimide resins are known as outstanding high performance materials. Polyetherimide resins can have a high glass transition temperature (Tg) of 217° C., high modulus and strength at elevated temperatures and excellent chemical resistance, according to ASTM D543-06. Polyetherimide has an amber color with yellowness index >50. This physical characteristic of polyetherimide limits its colorability to dark colors and fairly light colors, but not to very light colors such as certain white colors. Further, polyetherimide has low impact strength at room temperatures.

Lower heat materials such as polycarbonates and modified versions thereof (example, but not limited to polycarbonate esters) have excellent colorability, high impact strength and very good flow properties. However, these materials have poor resistance to harsh chemical reagents, susceptible to environmental stress cracking, poor UV resistance for light colors and relatively lower strength and modulus compared to polyetherimides.

Thus there exists a need to have a polymer resin system that can combine the above challenging, but desirable characteristics, all-in-one such as a chemically resistant, high flow, white-colorable, and good impact performance.

Blends of polyetherimide and PC have been evaluated for higher heat, improved ductility, flame retardance. However, the specific combination, of a resin system that simultaneously imparts excellent chemical resistance, according to ASTM D543-06, to harsh chemical reagents (e.g. concentrated sulfuric acid, phosphoric acid etc.), high flow (thin wall <1 mm), colorable to certain 'white' colors (defined by L,a,b values), being UV resistant (color shift dE<6-7 units after 300 hrs exposure to ASTM D4459) with good notched-impact strength (minimum 50 J/m at 23 C/2 lb hammer weight—at >15 wt % TiO2 pigment loading levels) and environmental stress cracking resistance to many chemicals such as hand sanitizers, moisturizers, sunscreen, cooking oil e.g. olive oils, hand creams etc.

Further, there is a clear need for plastic materials, in addition to possessing all of the above desired characteristics, to also be able to be metallized with a metal such as, but not limited to aluminum, preferably wherein the aluminum is deposited and anodized to provide desirable characteristics such as corrosion resistance and wear resistance, better adhesion to paints and dyes vs. bare metal.

However, most polymeric materials may not survive the various mechanical/chemical treatments (such as, but not limited to, pre-treatment, etching, milling, desmutting, anodizing, coloring, sealing) on the plastic material typically involved during the anodization process For the foregoing reasons, there is a need for a plastic material that can possess the aforementioned desired characteristics as well as be able to endure the anodization process by maintaining it properties and structural integrity.

The following patent references are hereby incorporated by reference in their entireties: U.S. Pat. Nos. 4,629,759; 4,816,527; 5,051,483; 5,106,915; 5,387,639; 7,452,944; 4,548,997; 4,673,708; 4,816,527; 6,011,122; 6,310,145; 3,405,042; 3,616,310; and 5,229,482.

The following non-patent references are hereby incorporated by reference in their entireties: http://www.aacoa.com/anodizing/process.htm; http://www.anodizing.org/Anodizing/processes.html; and http://en.wikipedia.org/wiki/Anodizing.

BRIEF SUMMARY OF THE INVENTION

One embodiment relates to a novel resin system comprising PEI-PC-Siloxane-PEI with a unique combination of properties. The properties can include, but are not limited to, high flow (<1 mm), chemical resistance, according to ASTM D543-06, to harsh reagents, strength retention under ESCR conditions, UV resistance after 300 hr exposure to ASTMD4459, good strength, modulus and impact performance even at very high $TiO_2$ pigment loading levels, very good endurance to the anodization process after exposure to harsh chemicals (such as but not limited to sulfuric acid, phosphoric acid, nitric acid, acetic acid, folinic acid etc.), colorable to very light colors (white) to dark colors (jet black). The synergistic functioning of this resin and additive system is important to realize the desired characteristics of good mechanical properties, UV resistance, chemical resistance, according to ASTM D543-06, high flow, colorability, ESCR in addition to enduring the anodization process that finds huge interest in the consumer electronics industry.

Various embodiments relate to compositions comprising: at least 15 wt. % of at least one polyetherimide other than the polyethermide siloxane; at least 35 wt. % of at least one polycarbonate; at least one polyetherimide siloxane; at least one UV stabilizer; and at least one colorant. The composition can exhibit a UV resistance of ΔE ranging from more than 0 to less than or equal to 10 units after exposure to ultraviolet light for 300 hours, per ASTM D-4459 protocol.

The composition can have a color selected from the group consisting of gray, black, white, light gray, and combinations thereof. Both the gray color and the black color can exhibit an L* value of below 80. When the composition has either the gray color or the black color, the at least one colorant can comprises at least 0.001 pph of carbon black. Both the white color and the light gray color can exhibit an L* value greater than or equal to 80. When the composition has either the white color or the light gray color, the at least one colorant can comprise less than 50 pph of titanium dioxide.

The weight ratio of polycarbonate to polyetherimide can provide the composition with a melt index ranging from 1.5 to 6 g/min., at 295° C. and at a loading level of 6.7 kg. The melt index can be sufficient to enable the composition to be molded into a cavity having a dimension of greater than 0 and less than or equal to 3 mm.

An article, comprising the composition and shaped by one selected from the group consisting of molding, extruding, and combinations thereof, can exhibits a strength retention of at least 50% when immersed in an acid solution for a period of 2 to 24 hours at a temperature of about 23° C. and at a strain level selected from the group consisting of 0%, 0.5%, 1.0%, and combinations thereof. The acid solution can be selected from the group consisting of sulfuric acid, nitric acid, phosphoric acid, formic acid, acetic acid, and combinations thereof, and wherein the acid solution has a concentration of at least 20%.

In another embodiment, an embodiment is a composition comprising:

at least 15 wt. % of at least one polyetherimide;

at least 35 wt. % of at least one polycarbonate;

at least one polyetherimide siloxane;

at least one UV stabilizer; and at least one colorant, wherein the composition exhibits a UV resistance of ΔE ranging from more than 0 to less than or equal to 10 units after exposure to ultraviolet light for 300 hours, per ASTM D-4459 protocol;

wherein the composition has a color selected from the group consisting of gray, black, white, light gray, and combinations thereof, wherein both the gray color and the black color exhibit an L* value of below 80;

wherein, when the composition has either the gray color or the black color, the at least one colorant comprises at least 0.001 pph of carbon black;

wherein both the white color and the light gray color exhibit an L* value greater than or equal to 80;

wherein, when the composition has either the white color or the light gray color, the at least one colorant comprises less than 50 pph of titanium dioxide;

wherein the weight ratio of polycarbonate to polyetherimide provides the composition with a melt index ranging from 1.5 to 6 g/min., at 295° C. and at a loading level of 6.7 kg;

wherein the melt index is sufficient to enable the composition to be molded into a cavity having a dimension of greater than 0 and less than or equal to 3 mm;

wherein an article, comprising the composition and shaped by one selected from the group consisting of molding, extruding, and combinations thereof, exhibits a strength retention of at least 50% when immersed in an acid solution for a period of <1 upto 24 hours at a temperature of about 23° C. and at a strain level selected from the group consisting of 0%, 0.5%, 1.0%, and combinations thereof;

wherein the acid solution is selected from the group consisting of sulfuric acid, nitric acid, phosphoric acid, formic acid, acetic acid, and combinations thereof, and wherein the acid solution has a concentration of at least 20%.

Other embodiments relate to shaping such compositions, and to articles comprising such compositions.

These and other features, aspects, and advantages of the present invention will become better understood with reference to the following description and appended claims.

DETAILED DESCRIPTION OF THE INVENTION

Some embodiments are based on the remarkable discovery that by using a specific combination of polyetherimide, polycarbonate, polyetherimide siloxane copolymer in specific conditions, it is possible to make a composition such that articles made from the composition exhibit UV resistance features that are suitable for several applications. Advantageously, the compositions can also be colored to certain colors while retaining the UV resistance features. Some embodiments relate to compositions (and articles made from the compositions) that can also exhibit a unique combination of flow properties, chemical resistance properties, according to ASTM D543-06, and ultraviolet resistance properties that make them suitable for certain applications, e.g., consumer electronic applications.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

One embodiment relates to a composition that exhibits a UV resistance of ΔE ranging from more than 0 to less than or equal to 10 units after exposure to ultraviolet light for 300 hours, per ASTM. D-4459 protocol. Generally, various embodiments relate to a composition comprising: (a) at least 15 wt. % of a polyetherimide; (b) at least 35 wt. % of a polycarbonate; and (c) a polyetherimide siloxane. The composition can have a variety of useful properties. Advantageously, in one embodiment, articles molded or extruded from our composition can exhibit a useful combination of UV resistance, colorability, and chemical resistance properties that are useful in consumer electronic applications.

The composition can have a tensile modulus of elasticity (MPa) per ASTM D638 protocol within a range having a lower limit and/or an upper limit. The range can include or exclude the lower limit and/or the upper limit. The lower limit and/or upper limit can be selected from 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700 and 3800 Mpa. For example, according to certain preferred embodiments, the composition can have a tensile modulus of elasticity (MPa) of from 2800 MPa to 3300 MPa.

The composition can have a tensile elongation at yield per ASTM D638 protocol within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, and 20%. For example, according to certain preferred embodiments, the composition can have a tensile elongation at yield ranging from 4% to 10%.

The composition can have a tensile elongation at break per ASTM D638 protocol within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85 and 90%. For example, according to certain preferred embodiments, the composition can have a tensile elongation at break per ASTM D638 protocol of from 1-80%. The composition can have a tensile stress at yield per ASTM D638 protocol within a range having a lower limit and/or an upper limit. The range can include or exclude the lower limit and/or the upper limit. The lower limit and/or upper limit can be selected from 35, 40, 45, 50, 55, 60, 65, 70, 75, 80, 85, 90, 95 and 100 MPa. For example, according to certain preferred embodiments, the composition can have a tensile stress at yield ranging from 55 MPa to 80 MPa.

The tensile stress at break, per ASTM D638 protocol, of compositions according to various embodiments can be within a range having a lower limit and/or an upper limit. The range can include or exclude the lower limit and/or the upper limit. The lower limit and/or upper limit can be selected from 5, 10, 15, 20, 25, 30, 35, 40, 45, 50, 55, 60, 65, 70, 75, 80, 85, 90, 95, 100, 105, 110, 115, 120 and 125 MPa. For example, according to certain preferred embodiments, the tensile stress at break of compositions according to various embodiments can range from 10 to 100 MPa.

The heat deflection temperature (1.82 MPa load) per ASTM D648 protocol of compositions according to various embodiments can be within a range having a lower limit and/or an upper limit. The range can include or exclude the lower limit and/or the upper limit. The lower limit and/or upper limit can be selected from 100, 105, 110, 115, 120, 125, 130, 135, 140, 145, 150, 155, 160, 165, 170, 175, 180, 185, 190, 195 and 200 degrees Celsius. For example, according to certain preferred embodiments, the heat deflection temperature (1.82 MPa load) of compositions according to various embodiments can range from 120° C. to 160° C.

The mold shrinkage imparted by a molding composition can generally be within a range having a lower limit and/or an upper limit. The range can include or exclude the lower limit and/or the upper limit. The lower limit and/or upper limit can be selected from 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95 and 2%. For example, according to certain preferred embodiments, the mold shrinkage imparted by a molding composition can generally be in a range of from 0.2 to 0.8%.

An article, shaped by molding or extruding the composition, can have a notched Izod impact strength per ASTM. D256 protocol that is within a range having a lower limit and/or an upper limit. The range can include or exclude the lower limit and/or the upper limit. The lower limit and/or upper limit can be selected from 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 and 500 J/m, as measured by a notched Izod (2 lb hammer, 23° C.). For example, according to certain preferred embodiments, an article, shaped by molding or extruding the composition, can have an impact strength that is at least 50 J/m, as measured by a notched Izod (2 lb hammer, 23° C.).

An article, shaped by molding or extruding the composition, can have a reverse-notched impact properties per ASTM D256 protocol 100 J/m (2 lb-ft/inch) to 2300 J/m (46 lb-ft/inch) (5 lb hammer, 23° C.) that is within a range having a lower limit and/or an upper limit. The range can include or exclude the lower limit and/or the upper limit. The lower limit and/or upper limit can be selected from 100, 200, 300, 400, 500, 600, 700, 800, 1000, 1100, 1200, 1300, 1400, 1500, 1600, 1700, 1800, 1900, 2000, 2100, 2200, 2300, J/m, as measured by a notched Izod (5 lb hammer, 23° C.). For example, according to certain preferred embodiments, an article, shaped by molding or extruding the composition, can have an impact strength that is at least 2000 J/m, as measured by Reverse Notched Izod with a 5 lb hammer at 23° C.

The composition can have a natural resin color, having a chromiticity C* with low variation. The variation of the chromaticity C* can be within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 and 20 units when a viewing angle changes from 15° to 110°, based on the angle of observation. For example, according to certain preferred embodiments, the variation of the chromaticity C* can be less than 12 units when a viewing angle changes from 15° to 110°, based on the angle of observation.

The hue angle of the composition can vary within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5 and 10 degrees. For example, according to certain preferred embodiments, the hue angle of the composition can vary by less than 5° based on a viewing angle change in a range of from 15° to 110°, even when the composition does not contain a colorant.

The chromaticity C* and the hue angle can have the above-identified variation when the viewing angle changes by an amount within a range having a lower limit and/or an upper limit. The range can include or exclude the lower limit and/or the upper limit. The lower limit and/or upper limit can be selected from 15, 20, 25, 30, 35, 40, 45, 50, 55, 60, 65, 70, 75, 80, 85, 90, 95, 100, 105 and 110 degrees. For example, according to certain preferred embodiments, The chromaticity C* can have the above-identified variation when the viewing angle changes by an amount of from 15° to 110°, based on the angle of observation.

Upon molding, compositions according to various embodiments can impart notched impact resistance properties per ASTM D256 protocol, to molded articles generally within a range having a lower limit and/or an upper limit. The range can include or exclude the lower limit and/or the upper limit. The lower limit and/or upper limit can be selected from 0.5, 1, 2, 3, 4, 5, 10, 15, 20, 25, 50, 75, 100, 200, 300, 400 and 500 lb-ft/inch. For example, according to certain preferred embodiments, upon molding, compositions according to various embodiments can impart impact resistance properties generally at least 1 lb-ft/inch (50 J/m for notched izod) at room temperature. In other embodiments, the lower limit and/or upper limit can be selected from 100, 200, 300, 400, 500, 600, 700, 800, 1000, 1100, 1200, 1300, 1400, 1500, 1600, 1700, 1800, 1900, 2000, 2100, 2200, 2300, J/m, as measured by a notched Izod (5 lb hammer, 23° C.). For example, according to certain preferred embodiments, an article, shaped by molding or extruding the composition, can have an impact strength that is at least 2000 J/m, as measured by Reverse Notched Izod with a 5 lb hammer at 23° C.

The composition can include one or more polyetherimides to provide high heat resistance, chemical resistance, according to ASTM D543-06, to multiple reagents, and initial resin color light enough to make bright white, jet black and any other colored products.

The composition can include an amount of polyetherimide within a range having a lower limit and/or an upper limit. The range can include or exclude the lower limit and/or the upper limit. The lower limit and/or upper limit can be selected from 5, 10, 11, 12, 13, 14, 15, 16, 17, 18, 19, 20, 25, 30, 35, 40, 45 and 50 wt. %. For example, according to certain preferred embodiments, the composition can include an amount of polyetherimide of at least 15 wt. %.

The polyetherimide can be a homopolymer or a copolymer.

The polyetherimide can be selected from (i) polyetherimide homopolymers, e.g., polyetherimides, (ii) polyetherimide co-polymers, e.g., siloxane-polyetherimides, polyetherimide sulfones, and (iii) combinations thereof. Polyetherimides are known polymers and are sold by SABIC Innovative Plastics under the Ultem*, Extem*, and Siltem* brands (Trademark of SABIC Innovative Plastics IP B.V.).

In one embodiment, the polyetherimides are of formula (1):

(1)

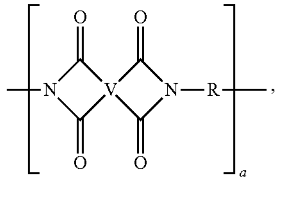

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

(2)

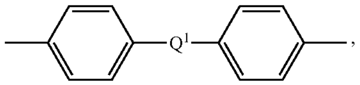

wherein $Q^1$ includes but is not limited to a divalent moiety such as —O—, —S—, —C(O)—, —$SO_2$—, —SO—, —$C_yH_{2y}$— (y being an integer from 1 to 5), and halogenated derivatives thereof, including perfluoroalkylene groups.

In an embodiment, linkers V include but are not limited to tetravalent aromatic groups of formula (3):

(3)

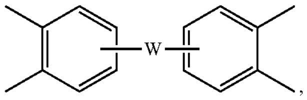

wherein W is a divalent moiety including —O—, —$SO_2$—, or a group of the formula —O—Z—O— wherein the divalent bonds of the —O— or the -O—Z—O— group are in the 3,3', 3,4', 4,3', or the 4,4' positions, and wherein Z includes, but is not limited, to divalent groups of formulas (4):

(4)

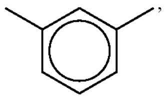,
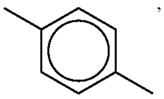,
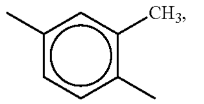
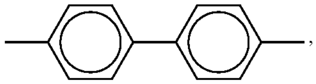,
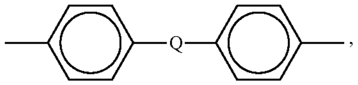,

-continued

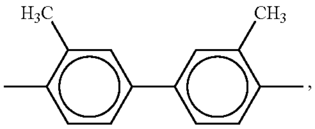,
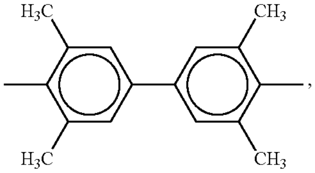,
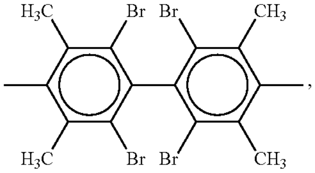, and
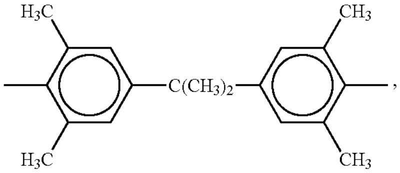, wherein Q includes, but is not limited to a divalent moiety including —O—, —S—, —C(O)—, —$SO_2$—, —SO—, —$C_yH_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

(5)

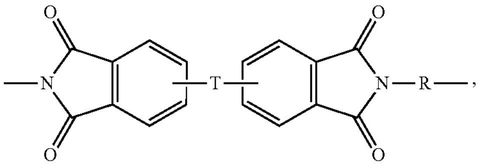

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyetherimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

(6)

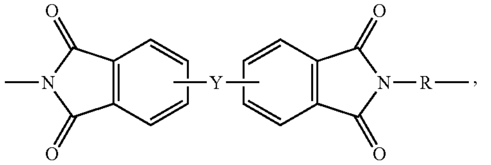

wherein Y is —O—, —$SO_2$—, or a group of the formula —O—Z—O— wherein the divalent bonds of the —O—, $SO_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —$SO_2$— groups.

It is to be understood that the polyetherimides and polyetherimide sulfones can optionally comprise linkers V that do not contain ether or ether and sulfone groups, for example linkers of formula (7):

(7)

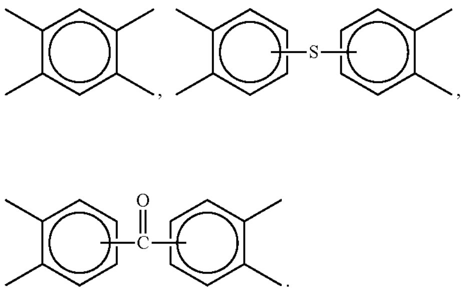

and

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

(8)

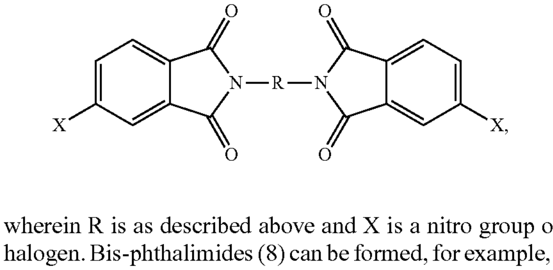

wherein R is as described above and X is a nitro group or a halogen. Bis-phthalimides (8) can be formed, for example, by the condensation of the corresponding anhydride of formula (9):

(9)

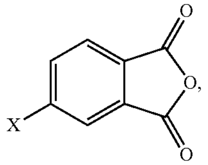

wherein X is a nitro group or halogen, with an organic diamine of the formula (10):

$$H_2N—R—NH_2 \quad (10),$$

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl)ether and 1,3-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis (aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the –O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —$SO_2$— and the remaining R groups are independently p-phenylene or m-phenylene or a combination comprising at least one of the foregoing; and T is group of the formula —O—Z—O— wherein the divalent bonds of the –O—Z—O— group are in the 3,3' positions, and Z is a 2,2-diphenylenepropane group.

The polyetherimide and polyetherimide sulfone can be used alone or in combination. In one embodiment, only the polyetherimide is used. In another embodiment, the weight ratio of polyetherimide: polyetherimide sulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370°C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and $NaNO_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (1):

(I)

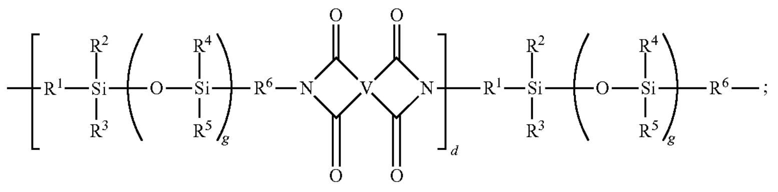

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997: 4,808,686 a polyetherimide sulfone resin, as described in U.S. Pat. No. 7,041,773 and combinations thereof, incorporated herein their entirety.

The polyetherimide resin can be a silicone polyetherimide comprising a dimethyl silicone in an amount within a range having a lower limit and/or an upper limit. The range can include or exclude the lower limit and/or the upper limit. The lower limit and/or upper limit can be selected from 0, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, and 60 weight percent. For example, the polyetherimide resin can be a silicone polyetherimide comprising from 1 to 40 weight percent of a dimethyl silicone, or from 5 to 40 weight percent of a dimethyl silicone. The polyetherimide resin can be a silicone polyetherimide comprising an amount of a dimethyl silicone, as described above, the dimethyl silicone can have a silicone block length within a range having a lower limit and/or an upper limit. The range can include or exclude the lower limit and/or the upper limit. The lower limit and/or upper limit can be selected from 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75 silicone repeat units. For example, the polyetherimide resin can be a silicone polyetherimide comprising from 5 to 40 repeat units of a dimethyl silicone, that is, having a silicone block length of 5 to 50 repeat units.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, and 300 degrees Celsius. For example, the polyetherimide resin can have a glass transition temperature (Tg) greater than about 200 degrees Celsius.

The polyetherimide resin can be substantially free of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free of halogen atoms. The polyetherimide resin can be free of halogen atoms. The polyetherimide resin can have an amount of halogen atoms below 100 ppm. In one embodiment, the amount of halogen atoms ranges from more than 0 to below 100 ppm. In another embodiment, the amount of halogen atoms is not detectable.

The composition can include an amount of polycarbonate within a range having a lower limit and/or an upper limit. The range can include or exclude the lower limit and/or the upper limit. The lower limit and/or upper limit can be selected from 5, 10, 15, 20, 25, 30, 35, 40, 45, 50, 55, 60, 65 and 70 wt. %. For example, according to certain preferred embodiments, the composition can include an amount of polycarbonate of at least 35 wt. %, or at least 50 wt. %. of polycarbonate.

The polycarbonate can be a homopolymer or a copolymer. The polycarbonate can be a copolymer of polycarbonate and siloxane or copolymer of polycarbonate and polycarbonate-ester or other polycarbonates copolymers. The polycarbonate can be a polycarbonate homopolymer or a polycarbonate copolymer as further described below. Polycarbonates are polymers having repeating structural carbonate units (1)

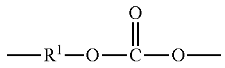

(1)

in which at least 60 percent of the total number of $R^1$ groups contain aromatic moieties and the balance thereof are aliphatic, alicyclic, or aromatic. In an embodiment, each R' is a $C_{6-30}$ aromatic group, that is, contains at least one aromatic moiety. $R^1$ can be derived from an aromatic dihydroxy compound of the formula HO—$R^1$—OH, in particular (2)

$$HO\text{-}A^1\text{-}Y^1\text{-}A^2\text{-}OH \qquad (2)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Also included are bisphenol compounds (3)

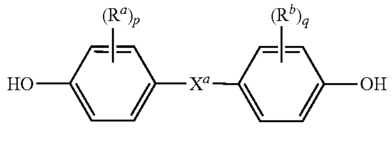

(3)

wherein $R^a$ and $R^b$ are each independently a halogen atom or a monovalent hydrocarbon group and may be the same or different; p and q are each independently integers of 0 to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is a single bond, —O—, —S—, —S(O)—, —$S(O)_2$—, —C(O)—, or a $C_{1-18}$ organic group. The $C_{1-18}$ organic bridging group can be cyclic or acyclic, aromatic or non-aromatic, and can further comprise heteroatoms such as a halogen, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In particular, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

Exemplary $C_{1-18}$ organic bridging groups include methylene, cyclohexylmethylene, ethylidene, neopentylidene, and isopropylidene, as well as 2-[2.2.1]-bicycloheptylidene and cycloalkylidenes such as cyclohexylidene, cyclopentylidene, cyclododecylidene, and adamantylidene. A specific example of bisphenol (3) wherein $X^a$ is a substituted cycloalkylidene is the cyclohexylidene-bridged, alkyl-substituted bisphenol (4)

(4)

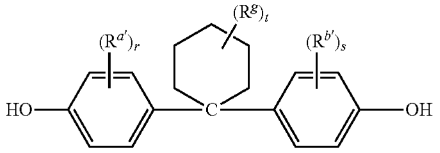

wherein $R^{a'}$ and $R^{b'}$ are each independently $C_{1-12}$ alkyl, $R^g$ is $C_{1-12}$ alkyl or halogen, r and are each independently 1 to 4, and t is 0 to 10. In a specific embodiment, at least one of each of $R^{a'}$ and $R^{b'}$ is disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one).

$X^a$ in bisphenol (3) can also be a substituted $C_{3-18}$ cycloalkylidene (5)

(5)

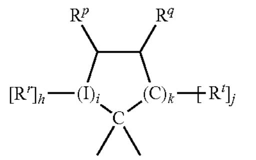

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

In another specific embodiment of the bisphenol compound (3), the $C_{1-18}$ organic bridging group includes groups —$C(R^c)(R^d)$— or —$C(=R^e)$—, wherein $R^e$ and $R^d$ are each independently a hydrogen atom or a monovalent $C_{1-6}$ linear or cyclic hydrocarbon group and $R^e$ is a divalent hydrocarbon group, p and q is each 0 or 1, and $R^a$ and $R^b$ are each a $C_{1-3}$ alkyl group, specifically methyl, disposed meta to the hydroxy group on each arylene group.

Other useful aromatic dihydroxy compounds of the formula HO—$R^1$—OH include aromatic dihydric compounds (6)

(6)

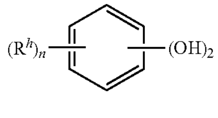

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxyibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds (3) include 1,1-bis(4-hydroxyphenyl) methane, 1,1-bis(4-hydroxyphenyl)ethane, 2,2-bis(4-hydroxyphenyl) propane (also known as "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (13).

"Polycarbonate" as used herein includes homopolycarbonates (wherein each $R^1$ in the polymer is the same), copolymers comprising different $R^1$ moieties in the carbonate units (referred to herein as "copolycarbonates"), copolymers comprising carbonate units and other types of polymer units (such as ester units, diorganosiloxane units, urethane units, arylene ether units, arylene sulfone units, arylene ketone units, and combinations thereof), and combinations of at least one homopolycarbonate and/or at least one copolycarbonate and/or at least one polycarbonate copolymer. As used herein, a "combination" is inclusive of blends, mixtures, alloys, reaction products, and the like.

A specific polycarbonate copolymer is a poly(carbonate-ester). Such copolymers further contain, in addition to repeating carbonate units (1), repeating ester units (7)

(7)

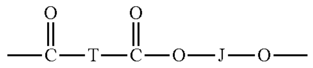

wherein J is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Poly(carbonate-ester)s containing a combination of different T and/or J groups can be used. The polycarbonate-ester)s can be branched or linear.

In an embodiment, J is a $C_{2-30}$ alkylene group having a straight chain, branched chain, or cyclic (including polycyclic) structure. In another embodiment, J is derived from an aromatic dihydroxy compound (3). In another embodiment, J is derived from an aromatic dihydroxy compound (4). In another embodiment, J is derived from an aromatic dihydroxy compound (6).

Exemplary aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof.

The molar ratio of carbonate units to ester units in the copolymers can vary broadly, for example 1:99 to 99:1, specifically 10:90 to 90:10, more specifically 25:75 to 75:25, depending on the desired properties of the final composition.

A specific embodiment of a polycarbonate-ester) (8) comprises repeating aromatic carbonate and aromatic ester units (8)

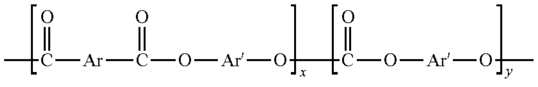

wherein Ar is divalent aromatic residue of a dicarboxylic acid or combination of dicarboxylic acids, and Ar' is a divalent aromatic residue of a bisphenol (3) or a dihydric compound (6). Ar is thus an aryl group, and is preferably the residue of isophthalic acid (9a), terephthalic acid (9b), (9a)

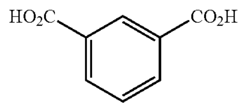

(9b)

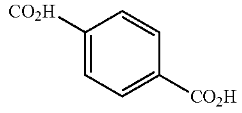

or a combination thereof. Ar' may be polycyclic, e.g., a residue of biphenol or bisphenol A, or monocyclic, e.g., the residue of hydroquinone or resorcinol.

Further in the polycarbonate-ester) (8), x and y represent the respective parts by weight of the aromatic ester units and the aromatic carbonate units based on 100 parts total weight of the copolymer. Specifically, x, the aromatic ester content, is 20 to less than 100 wt. %, specifically 30 to 95 wt. %, still more specifically 50 to 95 wt. %, and y, the carbonate content, is from more than zero to 80 wt. %, from 5 to 70 wt. %, still more specifically from 5 to 50 wt. %, each based on the total weight of units x+y. In general, any aromatic dicarboxylic acid conventionally used in the preparation of polyesters may be utilized in the preparation of poly(carbonate-ester)s (8) but terephthalic acid alone can be used, or mixtures thereof with isophthalic acid wherein the weight ratio of terephthalic acid to isophthalic acid is in the range of from 5:95 to 95:5. Poly(carbonate-ester)s (8) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC). In these embodiments the PCE or PPC (8) can be derived from reaction of bisphenol-A and phosgene with iso- and terephthaloyl chloride, and can have an intrinsic viscosity of 0.5 to 0.65 deciliters per gram (measured in methylene chloride at a temperature of 25° C.).

In another specific embodiment, a poly(carbonate-ester) comprises carbonate units (1) derived from a bisphenol compound (3), and ester units derived from an aromatic dicarboxylic acid and dihydroxy compound (6). Specifically, the ester units are arylate ester units (9)

(9)

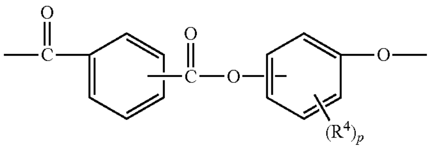

wherein each $R^4$ is independently a halogen or a $C_{1-4}$ alkyl, and p is 0 to 3. The arylate ester units (9) can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds. The arylate ester units (8) can be poly(isophthalate-terephthalate-resorcinol ester) units, also known as "ITR" esters.

The poly(carbonate-ester)s comprising arylate ester units (9) can comprise, based on the total weight of the copolymer, from 1 to less than 100 wt. %, 10 to less than 100 wt. %, 20 to less than 100 wt. %, or 40 to less than 100 wt. % of carbonate units (1) derived from a bisphenol compound (3), and from greater than 0 to 99 wt. %, greater than 0 to 90 wt. %, greater than 0 to 80 wt. %, or greater than 0 to 60 wt. % of ester units derived from an aromatic dicarboxylic acid and dihydroxy compound (6). A specific poly(carbonate-ester) comprising arylate ester units (9) is a poly(bisphenol-A carbonate)-co-poly(isophthalate-terephthalate-resoreinol ester).

In another specific embodiment, the poly(carbonate-ester) contains carbonate units (1) derived from a combination of a bisphenol (3) and an aromatic dihydric compound (6), and arylate ester units (9). The molar ratio of carbonate units derived from bisphenol (3) to carbonate units derived from aromatic dihydric compound (6) can be 1:99 to 99:1. A specific poly(carbonate-ester) of this type is a poly(bisphenol-A carbonate)-co-(resorcinol carbonate)-co(isophthalate-terephthalate-resorcinol ester).

The polycarbonates can further comprise siloxane units, for example a poly(carbonate-siloxane) or a polycarbonate-ester-siloxane). The siloxane units are present in the copolymer in polysiloxane blocks, which comprise repeating siloxane units (10)

(10)

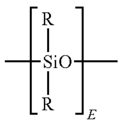

wherein each R is independently the same or different $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (10) can vary depending on the type and relative amount of each component in the composition, the desired properties of the, and like considerations. Generally, E has an average value of 5 to 50, specifically 5 to about 40, more specifically 10 to 30. A combination of a first and a second (or more) copolymers can be used, wherein the average value of E of the first copolymer is less than the average value of E of the second copolymer.

In an embodiment, the polysiloxane blocks are of formula (11) or (12)

(11)

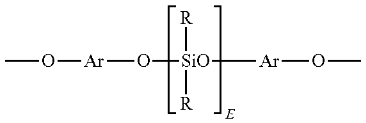

(12)

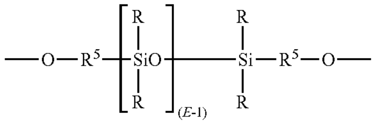

wherein E is as defined in siloxane (10) and each R can be the same or different, and is as defined in siloxane (1). Each Ar in blocks (11) and (12) can be the same or different, and is a substituted or unsubstituted $C_6$-$C_{30}$ arylene group, wherein the bonds are directly connected to an aromatic moiety. The Ar groups in (11) can be derived from a bisphenol (3), for example 1,1-bis(4-hydroxyphenyl) methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing compounds can also be used. Each $R^5$ in formula (12) is independently a divalent $C_1$-$C_{30}$ organic group, for example a divalent $C_2$-$C_8$ aliphatic group.

In a specific embodiment, the polysiloxane blocks are of formula (13):

(13)

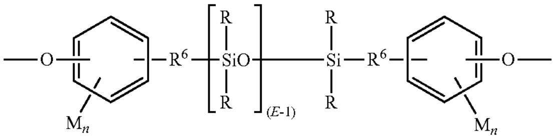

wherein R and E are as defined in formula (10); $R^6$ is a divalent $C_2$-$C_8$ aliphatic group; each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or $C_{6-8}$ aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

In an embodiment, the polycarbonate is a poly(carbonate-siloxane) which comprises carbonate units (1) derived from a bisphenol (3), specifically bisphenol A, and siloxane units (13) wherein M is methoxy, n is one, $R^2$ is a divalent $C_1$-$C_3$ aliphatic group, and R is methyl. The poly(carbonate-siloxane)s can comprise 50 to 99 wt. % of carbonate units and 1 to 50 wt. % siloxane units. Within this range, the poly(carbonate-siloxane)s can comprise 70 to 98 wt. %, more specifically 75 to 97 wt. % of carbonate units and 2 to 30 wt. %, more specifically 3 to 25 wt. % siloxane units.

In another embodiment, the polycarbonate is a poly(carbonate-ester-siloxane) which comprises carbonate units (1) derived from a bisphenol (3), specifically bisphenol A; siloxane units (13) wherein M is methoxy, n is one, $R^2$ is a divalent $C_1$-$C_3$ aliphatic group, and R is methyl and ester units (9), specifically (isophthalate-terephthalate-resorcinol) ester units.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplar), chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates in particular can also be prepared by interfacial polymerization as described above with respect to polycarbonates generally. Rather than utilizing the dicarboxylic acid or diol per se, the reactive derivatives of the acid or dial, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute. Combinations of polycarbonates of different flow properties can be used to achieve the overall desired flow property. In an embodiment polycarbonates are based on bisphenol A, in which each of $A^3$ and $A^4$ is p-phenylene and $Y^2$ is isopropylidene. The weight average molecular weight of the polycarbonate can be 5,000 to 100,000 Daltons, or, more specifically 10,000 to 65,000 Daltons, or, even more specifically, 15,000 to 35,000 Daltons as determined by GPC as described above.

The polyester-polycarbonates in particular are generally of high molecular weight and have an intrinsic viscosity, as determined in chloroform at 25° C. of 0.3 to 1.5 dl/gm, and preferably from 0.45 to 1.0 dl/gm. These polyester-polycarbonates may be branched or unbranched and generally will have a weight average molecular weight of from 10,000 to 200,000, preferably from 20,000 to 100,000 as measured by GPC as described above.

The poly(carbonate-siloxane)s can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards. The poly (carbonate-siloxane) can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

The foregoing polycarbonates can be used alone or in combination, for example a combination of a homopolycarbonate and one or more poly(carbonate-ester)s, or a combination of two or more poly(carbonate-ester)s. Blends of different polycarbonate-esters may be used in these compositions.

The polycarbonate component can contribute to high flow for thin-wall geometry (greater than 0 and $<$ or equal to 3 or $<$ or equal 2 or $<$ or equal 1 mm), can contribute to high impact strength ($>$50 J/m), can reduce resin YI, and can improve colorability/uniform color of the blend to provide uniformity of colored products.

In order for the composition to have very good flow to fill thin walls, the resin system it can be useful for the composition to have a melt index (MI) at 295° C., 6.7 kg of greater than or equal to 1.5 g/min. For purposes of the present invention thin walls can include thicknesses within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 and 4 mm. For example, according to certain preferred embodiments, thin walls can include thicknesses of greater than 0 to 3 mm, or from greater than 0 to less than or equal to 2 mm, or from greater than 0 to less than or equal to 1 mm.

Various embodiments can provide valuable flow features. When the composition has the polyetherimide component and the polycarbonate component in sufficient amounts, the composition can exhibit a melt index within a range having a lower limit and/or an upper limit. The range can include or exclude the lower limit and/or the upper limit. The lower limit and/or upper limit can be selected from 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 20, 25, 30, 35 and 40 g/min. For example, according to certain preferred embodiments, when the composition has the polyetherimide component and the polycarbonate component in sufficient amounts, the composition can exhibit a melt index ranging from 1.5 to 3 g/min, at a 295 C and a loading level of 6.7 kg. According to some preferred embodiments, the weight ratio of polycarbonate to polyetherimide can be selected to provide the composition with a melt index ranging from 1.5 to 6 g/min., at 295° C. and at a loading level of 6.7 kg. These flow features can be sufficient to enable the composition to be molded into a cavity having a dimension that is within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 and 4 mm. For example, according to certain preferred embodiments, thin walls can include thicknesses of greater than 0 to 3 mm, or from greater than 0 to less than or equal to 2 mm, or from greater than 0 to less than or equal to 1 mm.

Beneficially, the melt index can be sufficient to enable the composition to be molded into a cavity having a dimension greater than 0 and less than or equal to 3 mm. Preferably, the melt index can be sufficient to enable the composition to be molded into a cavity having a dimension greater than 0 and less than or equal to 1 mm.

In addition to having the desirable melt index, the composition can also exhibit a high notched and unnotched impact strength. An article molded or extruded from the composition can have an impact strength within a range having a lower limit and/or an upper limit. The range can include or exclude the lower limit and/or the upper limit. The lower limit and/or upper limit can be selected from 5, 10, 15, 20, 25, 30, 35, 40, 45, 50, 55, 60, 65, 70, 75, 80, 85, 90, 95, 100, 200, 300, 400 and 500 J/m. For example, according to certain preferred embodiments, an article molded or extruded from the composition can have an impact strength that is more than or equal to 50 J/m.

The weight ratio of polycarbonate to polyetherimide used to impart the desirable melt index and the desirable impact strength within a range having a lower limit and/or an upper limit. The range can include or exclude the lower limit and/or the upper limit. The lower limit and/or upper limit can be selected from 1:5, 2:5, 3:5, 4:5, 5:5. For example, according to certain preferred embodiments, the weight ratio of polycarbonate to polyetherimide used to impart the desirable melt index and the desirable impact strength can be from 2:5 to 4:5.

The composition can have excellent melt-processability to be molded into complex article shapes with ability to fill wall thicknesses within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 and 3 mm. For example, according to certain preferred embodiments, the composition can have excellent melt-processability to be molded into complex article shapes with ability to fill wall thicknesses <1 mm.

The composition can be melt-processed, using, but not limited to, the following methods injection molding, extrusion, and combinations thereof. The composition can contain polyetherimide to impart good melt stability and a melt viscosity of up to 30 minutes, which constitutes an improvement compared to polycarbonate resins. The resin system can be melt-processed at a minimum process temperature of 490° F. (254° C.).

The composition can include one or more polyetherimide siloxanes copolymers. As indicated above, siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (1):

(I)

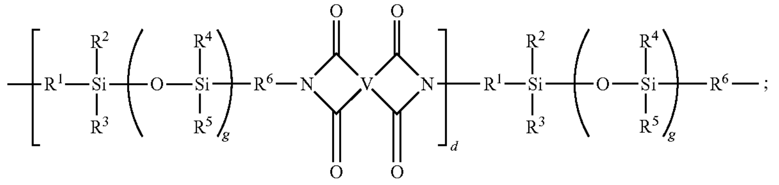

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

Various embodiments can provide valuable UV resistance. For example, as described above, an article molded or extruded from the composition exhibits a resistance to ultraviolet light exposure of ΔE ranging from 4 to 10 units, per ASTM D-4459 protocol after the article is exposed to ultraviolet light for 300 hours. According to various embodiments, the composition can further comprise an ultraviolet stabilizer.

Suitable ultraviolet (UV) stabilizers can include any stabilizer, which when used in accordance to our invention, enables our composition (or an article derived from the composition) to exhibit a UV resistance of ΔE ranging from more than 0 to less than or equal to 10 units after exposure to ultraviolet light for 300 hours, per ASTM D-4459 protocol. Examples of suitable UV stabilizers can include benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations thereof. Specific examples of UV stabilizers include and are not limited to 2,2"-Methylenebis(6-(2H-benzotriazol-2-yl)-4-4(1,1,3,3,-tetramethylbutyl)phenol, available as LA-31 RG having a CAS 103597-45-1; 2,2'-(p-phenylene) bis-4H-3,1-Benzoxazin-4-one, "available as Cyasorb UV-3638, and having CAS:18600-59-4. Suitable UV stabilizers are ordinarily such that when a composition of our invention is subjected to extrusion conditions, at least 70% of the stabilizer is retained in the composition. In one embodiment, the extrusion conditions involve extruding our composition into pellets at a die temperature ranging from 600 F-620 F. The composition can include a phosphorus stabilizer in an amount within a range having a lower limit and/or an upper limit. The range can include or exclude the lower limit and/or the upper limit. The lower limit and/or upper limit can be selected from 0.01, 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 and 20 wt. %. The phosphorous stabilizer can be mixed together with the other components of the composition. Alternatively, the phosphorous stabilizer can be introduced as a component of a polyetherimide thermoplastic resin composition comprising (a) a polyetherimide resin, and, (b) a phosphorous-containing stabilizer. A preferred phosphorous-containing stabilizer for the polyetherimide resin is described in U.S. Pat. No. 6,001,957, the entire disclosure of which is herein incorporated by reference. The phoshorous-containing stabilizer is present in an amount effective to increase the melt stability of the polyetherimide resin, wherein the phosphorous-containing stabilizer exhibits a low volatility such that, as measured by gravimetric analysis of an initial amount of a sample of the phosphorous-containing stabilizer, greater than or equal to 10% by weight of the initial amount of the sample remains unevaporated upon heating the sample from room temperature to 300° C. at a heating rate of 20° C. per minute under an inert atmosphere, wherein the phosphorous-containing compound is a compound according to the structural formula P—$R^1{}_a$, wherein each $R^1$ is independently H, alkyl, alkoxyl, aryl, aryloxy or oxo, and a is 3 or 4. For example, according to certain preferred embodiments, the composition can include a phosphorus stabilizer in an amount of between 0.01-10 wt. %, 0.05-10 wt. %, or from 5 to 10 wt. %.

UV additive loading levels can be selected to ensure that the said colored products have dE* (color change) against its original color, after 300 hrs UV exposure per ASTM D4459 protocol within a range having a lower limit and/or an upper limit. The range can include or exclude the lower limit and/or the upper limit. The lower limit and/or upper limit can be selected from 0.05, 0.1, 0.2, 0.3, 0.4, 0.5, 0.6, 0.7, 0.8, 0.9, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5 and 12 units. The lower limit and/or upper limit of the UV additive can be selected from 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 and 20 wt. %. For example, according to certain preferred embodiments, UV additive loading levels can be selected to ensure that the said colored products have dE* (color change) against its original color, after 300 hrs UV exposure per ASTM D4459 protocol of smaller that 5-6 units.

A light colored product can be produced. The light colored product can be a white or light gray color exhibiting an L* value greater than or equal to 80. The light colored product can be made with an amount of UV additive within a range having a lower limit and/or an upper limit. The range can include or exclude the lower limit and/or the upper limit. The lower limit and/or upper limit can be selected from 0.05, 0.1, 0.2, 0.3, 0.4, 0.5, 0.6, 0.7, 0.8, 0.9 0.5, 1, 1.5, 2, 2.5, 3, 3.5, 4, 4.5, 5, 10, 15, 20, 25, 30, 35, 40, 45, 50, 100, 150, 200, 250, 300, 350, 400, 450 and 500 pph. For example, according to certain preferred embodiments, the light colored product can be made with an amount of UV additive greater than 2 pph.

The composition and color package, according to various embodiments can have tolerance to chemical attacks. The colored products can also exhibit limited color change during parts fabrication processes.

Various embodiments can provide valuable chemical resistance, according to ASTM D543-06, to various reagents. The composition, according to various embodiments can contain a combination of polyetherimide and polyetherimide siloxane to impart excellent environmental stress crack resistance (ESCR) to upon exposure to various chemical reagents. An article molded or extruded from the composition can exhibits a strength retention within a range having a lower limit and/or an upper limit. The range can include or exclude the lower limit and/or the upper limit. The lower limit and/or upper limit can be selected from 50, 55, 60, 65, 70, 75, 80, 85, 90, 95 and 100% when the article is immersed in a chemical selected from the group of an acid solution having an acid concentration ranging from 20 to 70%, the acid solution selected from the group of sulfuric acid, nitric acid, phosphoric acid, formic acid, acetic acid, and combinations thereof, at a temperature of 23 C and strain level selected from the group of 0%, 0.5%, 1%, and combinations thereof, for a period ranging from 1 minute to <1 hr or up to 24 hours. For example, according to certain preferred embodiments, an article molded or extruded from the composition can exhibits a strength retention of at least 50% when the article is immersed in a chemical selected from the group of an acid solution having an acid concentration ranging from 20 to 70%, the acid solution selected from the group of sulfuric acid, nitric acid, phosphoric acid, formic acid, acetic acid, and combinations thereof, at a temperature of 23 C and strain level selected from the group of 0%, 0.5%, 1%, and combinations thereof, for a period ranging from 1 minute to <1 hr or up to 24 hours. In another embodiment, an article molded or extruded from the composition can exhibits a strength retention of at least 50%; when the article is immersed in a chemical reagent selected from the group consisting of olive oil, banana boat sunscreen SPF-30, Purell® Hand Sanitizer, sebum (naturally secreted oil by the skin), and combinations thereof at a temperature of 23 C and strain level selected from the group of 0%, 0.5%, 1%, and combinations thereof, for a period ranging from 1 minute to <1 hr or up to 24 hours. Advantageously, as such, articles molded or extruded from our composition can exhibit a useful combination of UV resistance, colorability, and chemical resistance properties that are useful in consumer electronic applications.

The composition can contain a combination of polyetherimide and polyetherimide siloxane to provide excellent chemical resistance, according to ASTM D543-06, to secondary chemical exposures seen by the molded article. Examples of chemical exposures include but are not limited to, sulfuric acid, nitric acid, formic acid, phosphoric acid, acetic acid at min. 20% concentration and at 20° C. or higher temperature conditions.

Typical polycarbonate resins cannot perform to the level of performance as the compositions according to various embodiments after exposure to cooking oils, hand sanitizers, moisturizers, sunscreen, hand cream etc. Polycarbonates can provide a minimum of 30% strength retention after exposure. More specifically, the resin system, after exposure (from <1 hr. up to 24 hrs) to various environmental chemical reagents (23° C.) can retain min. 30% retention.

Various embodiments can provide valuable color features. The composition can also include a colorant. The colorant can be any suitable colorant, including a pigment, a dye, and/or combinations thereof. The colorant can be an organic colorant, an inorganic colorant, and/or combinations thereof. The colorant can be titanium dioxide, carbon black, and/or combinations thereof.

The composition can include an amount of the colorant within a range having a lower limit and/or an upper limit. The range can include or exclude the lower limit and/or the upper limit. The lower limit and/or upper limit can be selected from 0, 5, 10, 15, 20, 25, 30, 35, 40, 45, 50, 55, 60, 65, 70 and 75 wt. %. For example, according to certain preferred embodiments. The composition can include an amount of the colorant greater than 0 to 50% by weight or from more than 0 to 25 wt. %.

The composition can have any suitable color including white, light gray, and/or combinations thereof. The white or light gray color can exhibit an L* value greater than or equal to 80. A composition having a white or light gray color can comprise an amount of titanium dioxide within a range having a lower limit and/or an upper limit. The range can include or exclude the lower limit and/or the upper limit. The lower limit and/or upper limit can be selected from 0, 5, 10, 15, 20, 25, 30, 35, 40, 45, 50, 55, 60, 65 and 70 pph. For example, according to certain preferred embodiments, a composition having a white or light gray color can comprise an amount of titanium dioxide of less than 50 pph.

The composition can have any suitable color including gray, black, and/or combinations thereof. The gray or black color can exhibit an L* value of below 80. A composition having a gray or black color can comprise an amount of carbon black within a range having a lower limit and/or an upper limit. The range can include or exclude the lower limit and/or the upper limit. The lower limit and/or upper limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900 and 1000 pph. For example, according to certain preferred embodiments, a composition having a gray or black color can comprise an amount of carbon black of at least 0.001 pph.

Other embodiments relate to articles comprising the composition. An article molded from the composition can have a yellowness index that is less than 120 when a colorant is not present and less than 100 when a colorant is present. An article molded from the composition can have a yellowness index that is less than 65. An article molded from the composition can have L* value greater than 85 without using titanium dioxide in an amount greater than 25 pph. The improved colorability and uniform color of blend comprising the composition can ensure uniformity of colored products.

The composition can have a white or light gray color, exhibiting an L* value greater than 85 without using titanium dioxide in an amount greater than 25 pph. The polycarbonate components can help to provide an initial color of the resin system having color value of YI, L*, a* and b*.

By employing a minimal loading level of SILTEM®, a polyetherimide siloxane, and by carefully selecting the type of polycarbonate is, the light colored products of the resin system, for example a white color, can provide a color change (dE*-CIE 94) not exceeding 10-11 units upon UV exposure per ASTM D4459 protocol without UV additives.

The composition can be made into light colored products, such as white or light gray, having L* value greater than 85 without using $TiO_2$ greater than 25 pph. The $TiO_2$ loading and the additive colors in the resin formulation can be controlled. The light colors can be reached within dE* smaller than 0.5 unit at $TiO_2$ loading below 50 pph (part-per-hundred) against the predetermined design targets. The resin system can be made into jet black that has no whitish pearlescent effect on the surface. The light colored products can have L* values greater than 85.

The initial resin color and color imparted by additives can control the colorability of the resin system. The resin system that can provide a white color that has smaller that 0.3-0.5 unit of dL*, da*, db* and dE* per CIE 94 standard against predetermined color targets. The initial resin can have a uniform color that is not viewing angle dependent, or that has a pearlescent effect. Component blendability can be measured by multiple viewing angle spectrophotometer to ensure that the uniform color is achievable. According to various embodiments, the color of the composition exhibits low variation, based on the angle of observation. The colored products can maintain their properties after fabrication.

Another embodiment relates to an article comprising a composition according to various other embodiments. For example a composition comprising at least 15 wt. % of a polyetherimide; at least 35 wt. % of a polycarbonate; a polyetherimide siloxane; and optionally, at least one UV stabilizer, wherein the composition exhibits a UV resistance of $\Delta E$ ranging from more than 0 to less than or equal to 10 units after exposure to ultraviolet light for 300 hours, per ASTM D-4459 protocol. The article can be a molded article. The article can be machined. The article can be selected from the group consisting of films, fibers, foams, and combinations thereof.

Still other embodiments relate to metalized articles comprising the composition. For example, according to some embodiments, the article can further comprise a metal substrate. The metal can be any metal allowing for good adhesion to the metal layer and imparting good cosmetic appearance. The resin system can retain its properties and structural integrity after being exposed to various metallization processes to be coated, for example, with Aluminum or other metals providing good adhesion to the metal layer and impart good cosmetic appearance.

As described above, an article, comprising the composition and shaped by one selected from the group consisting of molding, extruding, and combinations thereof, can exhibit a strength retention of at least 50% when immersed in an acid solution for a period of ranging from 1 minute to <1 hr or up to 24 hours at a temperature of about 23° C. and at a strain level selected from the group consisting of 0%, 0.5%, 1.0%, and combinations thereof. The acid solution can be selected from the group consisting of sulfuric acid, nitric acid, phosphoric acid, formic acid, acetic acid, and combinations thereof. The acid solution can have a concentration within a range having a lower limit and/or an upper limit. The range can include or exclude the lower limit and/or the upper limit. The lower limit and/or upper limit can be selected from 5, 10, 15, 20, 25, 30, 35, 40, 45, 50, 55, 60, 65, 70, 75, 80, 85 and 90%. For example, according to certain preferred embodiments, the acid solution can have a concentration of at least 20% or less than 70%.

One embodiment relates to a method for making an article comprising extruding, injection molding, compressing molding, machining, film pressing, one or more compositions according to other embodiments. The method can further comprise applying a metal substrate to the article.

According to various embodiments, a resin system comprising a blend of PEI, polycarbonate and Siltem can be molded to a final article in variety of colors, ranging from a natural color, a very light, or white color to avery dark or black color. The colors can be provided within a specific dE* limit. Multiple properties, indicative of the colors can be maintained after the final article is exposed to several environmental conditions such as but not limited to UV, ESCR, and mechanical contact. The mechanical contact can include, but is not limited to grinding/bead-blasting.

Another embodiment relates to a process of shaping the compositions described according to other embodiments. The process can comprise shaping the composition by at least one selected from the group consisting of injection molding, compression molding, extrusion, film shaping, machining and combinations thereof. The process can further comprise placing a substrate into the cavity before the composition is injection molded into the cavity and the composition adheres to the substrate. The substrate can be a metal. The metal can be aluminum. The process can further comprise extruding the composition and recovering a shaped article.

The composition can be injection molded into a cavity having a dimension within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, and 3.0 mm. For example, according to certain preferred embodiments, the composition can be injection molded into a cavity having a dimension greater than 0 and less than 1 mm.

Another embodiment relates to a process for producing a shaped article, the process comprising shaping a composition according to various other embodiments. For example a composition comprising at least 15 wt. % of a polyetherimide; at least 35 wt. % of a polycarbonate; a polyetherimide siloxane; and optionally, at least one UV stabilizer, wherein the composition exhibits a UV resistance of $\Delta E$ ranging from more than 0 to less than or equal to 10 units after exposure to ultraviolet light for 300 hours, per ASTM D-4459 protocol.

The shaping can be injection molding, compression molding, extrusion, film shaping, machining, and/or combinations thereof. The process can include extruding the composition and recovering a shaped article. The process can include injection molding the composition into a cavity having a dimension greater than 0 and less than or equal to 3 mm. The cavity can have a dimension of greater than 0 and less than 1 mm.

A substrate can be placed into the cavity before the composition is injection molded into the cavity and the composition can adhere to the substrate. The substrate can be any suitable material, such as a metal. The metal can be any suitable metal, preferably aluminum, copper, steel, and/or combinations thereof.

Another embodiment relates to a shaped article produced by the processes according to various other embodiments. The article can be a component of an electronic device. The electronic device can be a personal computer, a telephone, (mobile phones as well as landline phones), a digital camera, a Global Positioning System (GPS) device, a music player, a video player, a video display, hand held devices, e.g., touch screen devices such as computer laptops, tablet computers, smart phones, and/or combinations thereof.

Various embodiments relate to compositions comprising: at least 15 wt. % of at least one polyetherimide; at least 35 wt. % of at least one polycarbonate; at least one polyetherimide siloxane; at least one UV stabilizer; and at least one colorant.

The composition can exhibit a UV resistance of ΔE ranging from more than 0 to less than or equal to 10 units after exposure to ultraviolet light for 300 hours, per ASTM D-4459 protocol.

The composition can have a color selected from the group consisting of gray, black, white, light gray, and combinations thereof. Both the gray color and the black color can exhibit an L* value of below 80. When the composition has either the gray color or the black color, the at least one colorant can comprises at least 0.001 pph of carbon black. Both the white color and the light gray color can exhibit an L* value greater than or equal to 80. When the composition has either the white color or the light gray color, the at least one colorant can comprise less than 50 pph of titanium dioxide.

The weight ratio of polycarbonate to polyetherimide can provide the composition with a melt index ranging from 1.5 to 6 g/min., at 295° C. and at a loading level of 6.7 kg. The melt index can be sufficient to enable the composition to be molded into a cavity having a dimension of greater than 0 and less than or equal to 3 mm.

In another embodiment, the volume ratio of polycarbonate to polyetherimide can also provide the composition with a melt index ranging from 1.5 to 6 g/min., at 295° C. and at a loading level of 6.7 kg. The melt index can be sufficient to enable the composition to be molded into a cavity having a dimension of greater than 0 and less than or equal to 3 mm.

An article, comprising the composition and shaped by one selected from the group consisting of molding, extruding, and combinations thereof, can exhibits a strength retention of at least 50% when immersed in an acid solution for a period of <1 hr up to 24 hours at a temperature of about 23° C. and at a strain level selected from the group consisting of 0%, 0.5%, 1.0%, and combinations thereof.

The acid solution can be selected from the group consisting of sulfuric acid, nitric acid, phosphoric acid, formic acid, acetic acid, and combinations thereof, and wherein the acid solution has a concentration of at least 20%.

Other embodiments relate to shaping such compositions, and to articles comprising such compositions.

EXAMPLES

Materials

List of polymer raw materials used in resin formulation.

| Material | Description | Source |
|---|---|---|
| Polycarbonate A | A polycarbonate endcapped homopolymer sold under the trade name LEXAN 100 Resin | SABIC |
| Polycarbonate B | A polycarbonate endcapped homopolymer | SABIC |
| Polyetherimide A | Polyetherimide sold under the trade name Ultem 1010 Resin | SABIC |
| Polyetherimide B | Polyetherimide sold under the trade name Ultem 1000 Resin | SABIC |
| Polycarbonate C | Lexan PCE, copolymer of polycarbonate and polyesters | SABIC |
| Polycarbonate D | Lexan EXL*, copolymer of polycarbonate and siloxane | SABIC |
| Siloxane polyetherimide | Copolymer of Siloxane and polyetherimide | SABIC (Ultem 9000) |
| UV Stabilizer A | 2-(2'HYDROXY-5-T-OCTYLPHENYL)-BENZOTRIAZOLE | Weihai, Trade name UV5411 |
| UV Stabilizer B | 2,2'-Methylene bis-[4-(1,1,3,3-tetramethylbutyl)-6-(2H-benzotriazole-2-yl)phenol] | ADK, Trade name LA-31RG |
| UV Stabilizer C | 4H-3,1-Benzoxazin-4-one, 2,2'-(1,4-phenylene)bis- | Cytec |
| UV Stabilizer D | 2-(4,6-Diphenyl-1,3,5-triazin-2-yl)-5-hexyloxyphenol | BASF |
| UV Stabilizer F | 2,4-Bis(2,4-dimethylphenyl)-6-(2-hydroxy-4-isooctyloxyphenyl)-1,3,5-triazine. Acts as a UV light stabilizer | Cytec |
| UV Stabilizer G | Triazine derivative | BASF |
| Antioxidant Stabilizer | Hydrolytically stable Phosphite Stabilizer | Everspring Chemical, Trade name Everfos 168 |
| TiO2 | Titanium dioxide | Millenium |
| Carbon black | Carbon black | Cabot |
| S.R.52 | Macrolex Red 5B | Farbtex/Lanxess |
| P.B.28 | Sicopal Blue K6310 | BASF |

Methods for Making Articles for Mechanical Properties Evaluation Injection Molding Injection molding of ASTM parts was done on a 180-Ton DEMAG machine. The pellets were dried at 250° F. for a minimum of 8 hours prior to molding. The oil-heated mold was set at 200° F. A flat barrel temperature profile was set between 550° F.-570° F. Injection speed was set at ~1 inch/sec and screw speed at 75 RPM. The residence times were calculated from the equation below.

A.

B. Equation 1

Residence Time Calculation:

$$t = \frac{(\text{Barrel size(oz)})(\text{Sp. Gr.}/1.05)(28.35\ \text{g/oz})(\text{Cycle time(secs)})}{\text{Part Weight(g)}}$$

From the equation above, a cycle time of 30 seconds was used (residence time 2.5 min) to mold the ASTM parts.

Test Procedures for Color and Mechanical Properties Evaluation

Melt Flow Rate (MFR) on pellets (dried for 4 hours at 125° C. prior to measurement) was measured according to ASTM D1238 method at dwelling time of 360 seconds and a load of 6.6 kgf and temperature of 295° C.

Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested according to ASTM D638 method using injection molded bars at 23° C. with a crosshead speed of 5 mm/min.

Izod notched and reverse notched impact was measured at 23° C. with a pendulum of 2 lbf/ft and 5 lbf/ft pendulum energy respectively according to ASTM D256 method.

Flexural properties or three point bending were measured at 23° C. on acrosshead speed of 1.3 mm/min according to ASTM D790 method.

Heat Deflection Temperature was tested on five bars having the dimensions 5×0.5×0.125 inches (127×12.7×3.2 mm) using ASTM method D648.

Chemical resistance tests were performed by soaking the color plaques into specified chemical concentrations and exposure conditions. Color differences dE* was measured by spectrophotometer on difference between before and after chemical exposure. Similarly, the ASTM Tensile bars were immersed in the same chemical for predefined exposure conditions and the parts were tested for strength retention before and after chemical exposure using the same ASTM D638 method described above.

Color measurements were performed on injection molded 2"×3" color plaque at 0.1" thickness using i7 spectrophotometer made by X-Rite under measurement conditions of CWF lighting, 10 degree observer CIE 94 standard, both UV and specular component included (SC) mode.

UV test was performed according to ATSM D4459 and the color shift of DE* was the difference of between color plaques before and after exposure and measured by i7 spectrophotometer.

Methods for Making Composition for Color Match and UV Stabilization Evaluation

The resin and colorants components were dry blended. The blend was extruded into pellets using Prizm 25 mm twin screw extruder Model TSE24 HC at 600 F-620 F die temperature.

Methods for Molding Articles for Color Match and UV Stabilization Evaluation

The extruded pellets were molded into 2"×3" color plaques using 85 ton molder. Nissei 85 Ton molder Model FN1000 at barrel temperature of 600 F-620° F. and mold face temperature of 200° F.-225° F. Normal injection speed and standard cycle times were used. The following are examples to demonstrate the invention.

Example 1-4 & Comparative Example 1

The purpose of these examples was to make compositions in accordance with our invention and to demonstrate that the inventive compositions have balance properties in terms of resin colorability, improved UV performance and well maintained physical properties.

Compositions were made in accordance to the procedure mentioned above in which all components in Table 1 were dry blended, extruded and molded into color plaques according to the procedure. Each example in Table 1 represents a super white color of polyetherimide/polycarbonate blend. Inventive Example 1 through 4 includes UV stabilizer B whereas Comparative Example 1 excludes UV stabilizer B for direct comparison on a equal base formula

TABLE 1

Compositions Used in Inventive Examples 1-4 & Comparative Example 1

| | Example 1 | Example 2 | Example 3 | Example 4 | Comparative Example 1 |
|---|---|---|---|---|---|
| Polyetherimide A | 33.900 | 33.900 | 33.900 | 33.900 | 33.900 |
| Siloxaane Polyetherimide | 6.000 | 6.000 | 6.000 | 6.000 | 6.000 |
| Polycarbonate A | 56.8800 | 56.8800 | 56.8800 | 56.8800 | 56.8800 |
| Polycarbonate B | 3.0000 | 3.0000 | 3.0000 | 3.0000 | 3.0000 |
| UV Stabilizer A | 0.1200 | 0.1200 | 0.1200 | 0.1200 | 0.1200 |
| TiO2 | 18.660 | 18.6600 | 18.6600 | 18.6600 | 18.6600 |
| S.R.52 | 0.00166 | 0.00166 | 0.00166 | 0.00166 | 0.00166 |
| S.V.13 | 0.00084 | 0.00084 | 0.00084 | 0.00084 | 0.00084 |
| P.B.28 | 0.0720 | 0.0720 | 0.0720 | 0.0720 | 0.0720 |
| UV Stabilizer B | 2.0000 | 4.0000 | 6.0000 | 8.0000 | xx |

Our results show that the examples of our invention, articles made from our composition exhibited a UV resistance of ΔE* ranging from more than 0 to less than or equal to 10 units after exposure to ultraviolet light for 300 hours, per ASTM D-4459 protocol. Our results also show that when an article was not made from a composition in accordance to our invention, the article did not exhibit a UV resistance of ΔE* ranging from more than 0 to less than or equal to 10 units after exposure to ultraviolet light for 300 hours, per ASTM D-4459 protocol.

TABLE 2

| Initial Color Data for Inventive Example 1-4 & Comparative Example 1 | | | | | |
|---|---|---|---|---|---|
| | Example 1 | Example 2 | Example 3 | Example 4 | Comparative Example 1 |
| L* | 91.29 | 91.05 | 90.67 | 90.14 | 91.32 |
| a* | -0.56 | −0.64 | −0.67 | −0.76 | −0.66 |
| b* | 0.21 | 0.79 | 1.27 | 1.76 | −0.2 |

Table 2 shows initial color data of inventive Example 1 through 4 and Comparative Example 1 before UV exposure. Since UV stabilizer itself usually has yellow color, its addition into the white base formula will affect object color, usually making a white less white and reducing L* value. As seen in Table 1 and 2, UV stabilizer B, as an ideal on in Example 1 through 4, does not substantially reduce L* value versus the Comparative Example 1, even at loading as high as 8 pph (parts-per-hundred). This is critical especially when a target color in real application, such as hand held consumer electronic devices, is a super white having L* value above 90 units and UV stability is essential at the same time as the color is directly seen by devices' users every day. Generally, when L* value is lowered by addition of a colored material, such as yellowish UV stabilizer, increasing loading of a white pigment, such as $TiO_2$ is the only way to boost L* value. However, higher $TiO_2$ loading is undesired as it often reduces resin physical properties, such as high melt flow and lower impact strength. Initial color data in Table 2 demonstrate that the inventive compositions with UV stabilizer B included are able to achieve white colors having L* value exceeding 90 without a need to increase $TiO_2$ loading At the same time, the 300 hours of UV exposure data per ASTM D4459 in Table 3 show that the inventive Example 1 through 4 have reduced DE*, compared against the Comparative Example 1, with improved UV stability over 20 to 54% depending on the loading of UV stabilizer B Data demonstrate the inventive compositions were able to achieve a white color that has L* value exceeding 90 without need to increase TiO2 loading, compared against the Comparative Example 1, even when yellowish UV stabilizer is at high loadings. The significance of this is that improvements in UV performance (See Table 3) by inclusion of a yellowish UV stabilizer are not made at expenses of resin colorability to achieve a desired white color having high L* value without significant increase in TiO2 loading.

TABLE 3

| UV Exposure Data for Example 1-4 & Comparative Example 1 | | | | | | |
|---|---|---|---|---|---|---|
| | | Example 1 | Example 2 | Example 3 | Example 4 | Comparative Example 1 |
| DE* | Initial | 0.00 | 0.00 | 0.00 | 0.00 | 0.00 |
| | 100 Hrs | 4.77 | 3.66 | 2.73 | 2.38 | 6.43 |
| | 200 Hrs | 5.84 | 4.66 | 3.61 | 3.22 | 7.68 |
| | 300 Hrs | 7.46 | 6.08 | 5.04 | 4.38 | 9.59 |
| | UV Stability Improvements | 22.2% | 36.6% | 42.2% | 54.3% | 0 |

TABLE 4

| Physical Properties for Inventive Example 1-4 & Comparative Example 1 | | | | | | | |
|---|---|---|---|---|---|---|---|
| TEST | ASTM | Unit | Example 1 | Example 2 | Example 3 | Example 4 | Comparative Example 1 |
| Flexural Modulus | D790 | MPa | 2813 | NA | NA | 3192 | 2861 |
| Flexural Strength | D790 | MPa | 109 | NA | NA | 117 | 107 |
| | | | | NA | NA | | |
| Tensile Modulus | D638 | MPa | 2882 | NA | NA | 3054 | 2841 |
| Tensile Strength | D638 | MPa | 68 | NA | NA | 71 | 67 |
| | | | | NA | NA | | |
| Impact Strength (N) | D256 | J/m | 112 | NA | NA | 341 | 166 |
| Impact Strength (RN) | D256 | J/m | 2120 | NA | NA | 1576 | 2121 |
| | | | | NA | NA | | |
| HDT (0.45 MPa) | D648 | ° C. | | NA | NA | | |
| HDT (1.82 MPa) | D648 | ° C. | 135 | NA | NA | 130.4 | 136 |
| | | | | NA | NA | | |
| MI (295 C., 6.7 kg) | D1238 | ° C. | 1.77 | NA | NA | 3.21 | 1.29 |
| Sp Gr | D792 | — | 1.36 | NA | NA | 1.36 | 1.37 |

Mechanical property such as tensile, flexural, HDT and Izod impact are listed in Table 4 for Invention examples 1 to 4 and Comparative Example 1. Invention examples 1,4 and Comparative Example 1 maintain good mechanical properties such as tensile and flexural properties, HDT properties that are comparable one another. t must be mentioned here that the Invention example 4 displayed the best impact and flow properties. The results demonstrate that inclusion of UV stabilizer B has no obvious adverse effect on targeted physical properties, even at loading as high as 8 pph. Thus, the invention has made resin composition to achieve a balance of coloraBility, enhanced UV performance while maintaining good mechanical properties.

Example 5-7 & Comparative Example 2

The purpose of Example 5-7 was to show the inventive compositions have improved initial color uniformity as a result of properly selected resin components over the Comparative Example 2. Polyetherimide usually does not blend well with other resins, such as polycarbonate. When two are blended together, they are immiscible each other forming an opaque resin system that has two morphological phases, which interact with incident light in such a way that they render the blend a non-uniform color appearance. Such non-uniform natural resin color will then results in surface color variation when a colored article is made out of the resin blend. Table 5 shows composition of each example, which was blended, extruded and molded according to the procedure mentioned before.

TABLE 5

Composition Used in Example 5-7 and Comparative Example 2

| | Example 5 | Example 6 | Example 7 | Comparative Example 2 |
|---|---|---|---|---|
| Polyetherimide A | 33.900 | 33.900 | 33.900 | 33.9000 |
| Siloxane Polyetherimide | 6.000 | 6.000 | 6.000 | 6.000 |
| Polycarbonate A | 56.8800 | 56.8800 | 56.8800 | Xx |
| Polycarbonate B | 3.0000 | 3.0000 | 3.0000 | Xx |
| UV Stabilizer A | 0.1200 | 0.1200 | 0.1200 | Xx |
| UV Stabilizer B | 4.000 | 6.000 | 8.000 | Xx |
| Polycarbonate C | xx | Xx | xx | 60.000 |

TABLE 6

Surface Color Data for Inventive Example 5-7 and Comparative Example 2

| | ° | Example 5 | Example 6 | Example 7 | Comparative Example 2 |
|---|---|---|---|---|---|
| C* | 15° | 17.388 | 18.541 | 19.292 | 1.052 |
| | 45° | 25.717 | 26.885 | 27.524 | 16.218 |
| | 75° | 26.721 | 28.043 | 28.52 | 24.947 |
| | 110° | 26.701 | 28.162 | 28.653 | 27.173 |
| h° | 15° | 94.7 | 92.7 | 93.5 | 168.0 |
| | 45° | 93.6 | 92.1 | 92.8 | 92.7 |
| | 75° | 93.3 | 91.7 | 92.4 | 91.3 |
| | 110° | 93.3 | 91.9 | 92.5 | 92.0 |
| Delta C* | 15° ---> 110° | 9.3 | 9.6 | 9.3 | 27.4 |
| Delta h° | 15° ---> 110° | 1.4° | 0.8° | 1.1° | 76° |

Table 6 are color data measured on 2"×3" color plaques using Gonio spectrophotometer that measures color property at multiple viewing angles from 15° to 110°. Color parameter C* is chromaticity representing degree of color saturation. The higher the value, the more saturate the color, which is then perceived more intense. Color parameter h° is hue angle and each angle represents a particular color. Comparative Example 2 in Table 6 represents a typical polyetherimide/polycarbonate blend and inventive example 5, 6 & 7 are new blends replacing Polycarbonate C with Polycarbonate A and B. Data in Table 6 suggest when a viewing angle changes from 15° to 110°, color of natural resin changes as both C* and h° have different numbers. However, chromaticity C* of the inventive Example 5 through 7 have delta ranges of 9.3, 9.6 and 9.3 respectively, all of which are much smaller than 27.4 of the Comparative Example 2. Visually, the Comparative Example is perceived much more color intensity difference than that of the inventive examples when viewing angle is changed. In similar fashion, delta ranges of hue angle h°, when a viewing angle changes from 15° to 110°, the inventive Example 5 through 7 are 1.4°, 0.8° and 1.1° respectively as oppose to 76° for the Comparative Example 2. Both smaller delta ranges of C* and h° suggest that the inventive compositions have more uniform color on the surfaces of molded plaques than that of Comparative Example 2 when POLYCARBONATE C is replaced by polycarbonate A and B.

Example 8-14, Example 1 & Comparative Example 3

Examples in Table 7A and 7B are to demonstrate another aspect of the invention, that is the new blends of polyetherimide/polycarbonate have improved UV performance without use of UV stabilizer by replacing polycarbonate C in typical polyetherimide/polycarbonate blend as shown in Comparative Example 3 with single polycarbonate A or in combination with polycarbonate B, or even by single polycarbonate D. When additional UV stability is required, proper UV stabilizer can be used without significant adverse effect on blends colorability.

Table 7A and 7B is compositions of inventive Example 8 through 14, Example 1 and Comparative Example 3. They were extruded and molded into 2"×3" color plaques for UV testing. The purpose of these examples was to demonstrate inventive compositions' UV performance improvement when polycarbonate C is replaced either by polycarbonate A only or in combination with polycarbonate B at different levels or completely by polycarbonate D. Each composition represented a white color and comparisons are made on same white color package that includes $TiO_2$, carbon black, S.R.52 and P.B.28.

Tables 7A and 7B: Compositions in Example 8-11, Example 1 & Comparative Example 3

TABLE 7A

| Name | Example 8 | Example 1 | Example 9 | Example 10 | Example 11 | Comparative Example 3 |
|---|---|---|---|---|---|---|
| Polyetherimide B | 33.900 | 33.900 | 53.900 | 53.900 | 33.900 | 33.900 |
| Siloxane polyetherimide | 6.0000 | 6.000 | 6.0000 | 6.0000 | 6.00 | 6.0000 |
| Polycarbonate A | 56.8800 | 56.8800 | 36.8800 | 36.8800 | xx | xx |
| Polycarbonate B | 3.0000 | 3.000 | 3.0000 | 3.0000 | xx | xx |
| Polycarbonate C | xx | xx | Xx | xx | xx | 60.0000 |
| Polycarbonate D | xx | xx | Xx | xx | 59.802 | xx |
| UV Stabilizer A | 0.1200 | 0.1200 | 0.1200 | 0.1200 | 0.1200 | xx |
| TiO2 | 16.7580 | 18.660 | 16.7580 | 16.7580 | 16.7580 | 16.7580 |
| Carbon black | 0.0006 | 0.00166 | 0.0006 | 0.0006 | 0.0006 | 0.0006 |
| S.R.52 | 0.00170 | 0.00084 | 0.00170 | 0.00170 | 0.00170 | 0.00170 |

TABLE 7A-continued

| Name | Example 8 | Example 1 | Example 9 | Example 10 | Example 11 | Comparative Example 3 |
|---|---|---|---|---|---|---|
| P.B.28 | 0.0900 | 0.0720 | 0.0900 | 0.0900 | 0.0900 | 0.0900 |
| UV stabilizer B | xx | 2.000 | Xx | 2.000 | xx | xx |

TABLE 7B

| Name | Example 12 | Example 13 | Example 14 | Comparative Example 3 |
|---|---|---|---|---|
| Polyetherimide B | 33.900 | 53.900 | 53.900 | 33.900 |
| Siloxane polyetherimide | 6.00 | 6.00 | 6.00 | 6.0000 |
| Polycarbonate A | Xx | xx | xx | Xx |
| Polycarbonate B | xx | xx | xx | Xx |
| Polycarbonate C | xx | xx | xx | 60.0000 |
| Polycarbonate D | 59.802 | 39.802 | 39.802 | Xx |
| UV Stabilizer A | 0.1200 | 0.1200 | 0.1200 | Xx |
| TiO2 | 16.7580 | 16.7580 | 16.7580 | 16.7580 |
| Carbon black | 0.0006 | 0.0006 | 0.0006 | 0.0006 |
| S.R.52 | 0.00170 | 0.00170 | 0.00170 | 0.00170 |
| P.B.28 | 0.0900 | 0.0900 | 0.0900 | 0.0900 |
| UV stabilizer B | 2.000 | xx | 2.000 | Xx |

Tables 8A & 8B: Initial Color Data for Example 8-14, Example 1 & Comparative Example 3

TABLE 8A

| | Example 8 | Example 1 | Example 9 | Example 10 | Example 11 | Comparative Example 3 |
|---|---|---|---|---|---|---|
| L* | 88.13 | 91.29 | 88.87 | 89.36 | 88.69 | 91.32 |
| a* | −0.59 | −0.56 | −0.72 | −0.81 | −0.11 | −0.66 |
| b* | 0.02 | 0.21 | 0.61 | 1.17 | 1.90 | −0.20 |

TABLE 8B

| | Example 12 | Example 13 | Example 14 | Comparative Example 3 |
|---|---|---|---|---|
| L* | 88.85 | 88.26 | 88.50 | 91.32 |
| a* | −0.20 | −0.32 | −0.38 | −0.66 |
| b* | 2.18 | 2.33 | 2.72 | −0.20 |

Table 8 shows initial color data before UV exposure. Comparative Example 3 represented good colorability of a typical polyetherimide/polycarbonate blend achieved as it can make a super white having L* value over 90. However, its UV performance shows 14 units of DE* after 300 hours exposure (Table 9A).

Example 8 represents inventive formulation, in which Polycarbonate C was replaced by Polycarbonate A and B. The formulation was also made polycarbonate rich as the Comparative Example 3. The new blend has DE* of 10.0 after 300 hours exposure, representing a 30.3% improvement (Table 9A). With additional UV stabilizer B as seen in Example 1 (Table 7A), UV performance is further improved to DE* of 7.46, representing a 47.8% improvement (Table 9A). At the same time, the Example 1 can achieve the same L* value as the Comparative Example 3 by slightly adjustment in $TiO_2$ loading.

Example 9 represented another inventive formulation in which the Polycarbonate C was replaced by Polycarbonate A and Polycarbonate B. But unlike the Example 8, the formulation is made into Polyetherimide rich (Table 7A). Its UV performance was also enhanced as shown smaller DE* of 11.03 after 300 hrs exposure vs the 14 units of the Comparative Example 3, representing a 22.9% improvement. With additional UV stabilizer as shown in Example 10, UV performance was further improved by an even smaller DE* of 9.14, representing a 36.04% improvement (Table 9A).

Example 10 represents another inventive formulation in which the Polycarbonate C is replaced by Polycarbonate D (Table 7A) and the formulation was made into polycarbonate rich like the Comparative Example 3. Without UV stabilizer, the formulation exhibited excellent UV performance of much smaller DE* of 3.78 as oppose to DE* of 14 units in the Comparative Example 3 after 300 hrs exposure, representing a 73.54% improvement (Table 9A). With additional UV stabilizer as shown in Example 12 (Table 7B), DE*was even further reduced to 2.01, representing an 85.93% improvement (Table 9B).

Example 13 represents another inventive formulation in which the Polycarbonate C was replaced by Polycarbonate D. But different from Example 11, the formulation was made into Polyetherimide rich (Table 7B). Its UV performance is improved with a smaller DE* of 7.76 versus DE* of 14 for the Comparative Example 3 after 300 hrs exposure, representing a 45.70% improvement. By additional UV stabilizer, the UV performance was further improved as seen DE* is further reduced to 6.30 as shown in Example 14, representing a 55.91% improvement (Table 9B).

Data suggest when polycarbonate C was replaced by polycarbonate A,/polycarbonate B or polycarbonate D, resin compositions of the inventive Example 8 through 14 were still able to make a bright white color that has L* value greater than 85 with reasonable TiO2 loading. When a white color has L* over 90 as Comparative Example 3, the resin composition, such as Example 8, was able to match its L*, a* and b* values, as shown in Example 1, by slightly adjust components of color package, especially $TiO_2$ loading. When additional UV stabilizer B was included, the UV performance of Example 8 was further improved (see Example 8 vs Example 1 in Tables 9 A and 9B).

Tables 9 A and 9B: UV Data after 300 Hours Exposure for Example 8-14, Example 1 & Comparative Example 3

TABLE 9 A

| | | Example 8 | Example 1 | Example 9 | Example 10 | Example 11 | Comparative Example 3 |
|---|---|---|---|---|---|---|---|
| | Initial | 0.00 | 0.00 | 0.00 | 0.00 | 0.00 | 0.00 |
| DE* | 100 Hrs | 5.95 | 4.77 | 6.65 | 5.03 | 1.41 | 11.12 |
| | 200 Hrs | 8.64 | 5.84 | 9.82 | 7.99 | 2.92 | 13.41 |
| | 300 Hrs | 10.00 | 7.46 | 11.02 | 9.14 | 3.78 | 14.29 |
| UV Stability Improvement | | 30.0% | 47.8% | 22.9% | 36.0% | 73.5% | 0 |

TABLE 9B

| | | Example 12 | Example 13 | Example 14 | Comparative Example 3 |
|---|---|---|---|---|---|
| | Initial | 0.00 | 0.00 | 0.00 | 0.00 |
| DE* | 100 Hrs | 1.38 | 3.99 | 2.67 | 11.12 |
| | 200 Hrs | 1.43 | 6.82 | 5.23 | 13.41 |
| | 300 Hrs | 2.01 | 7.76 | 6.30 | 14.29 |
| UV Stability Improvement | | 85.9% | 45.7% | 55.9% | 0 |

Tables 9A and 9B shows UV exposure data per ASTM D4459 for inventive Example 8-14, 1 and Comparative Example 3. Data demonstrate that when POLYCARBONATE C was replaced by polycarbonate A and polycarbonate B or polycarbonate D, UV performance was significantly improved as shown DE* reduced from 14.29 of the Comparative Example 3 to 10.00 of Example 8, 11.02 of Example 9, 3.78 of Example 11 and 7.76 of Example 13. When UV stabilizer B was used as shown in Example 1, UV performance is further improved as DE* further drops from 10.00 of Example 8 to 7.46 in Example 1, from 11.02 of Example of 9 to 9.14 in Example 10, from 3.78 of Example of 11 to 2.01 in Example 12 and from 7.76 of Example of 13 to 6.30 in Example 14.

Tables 10 A and 10 B: Physical Properties in Example 8-11, 1 & Comparative Example 3

TABLE 10A

| TEST | ASTM | Unit | Example 8 | Example 1 | Example 9 | Example 10 | Comparative Example 3 |
|---|---|---|---|---|---|---|---|
| Flexural Modulus | D790 | MPa | 2861 | 2813 | 2992 | 2744 | 2551 |
| Flexural Strength | D790 | MPa | 107 | 109 | 120 | 115 | 112 |
| Tensile Modulus | D638 | MPa | 2841 | 2882 | 2972 | 3151 | 2372 |
| Tensile Strength | D638 | MPa | 67 | 68 | 73 | 76 | 81 |
| Impact Strength (N) | D256 | J/m | 166 | 112 | 119 | 151 | 315 |
| Impact Strength (RN) | D256 | J/m | 2121 | 2120 | 2073 | 2130 | 2143 |
| HDT (0.45 MPa) | D648 | ° C. | | | | | |
| HDT (1.82 MPa) | D648 | ° C. | 136 | 135 | 143 | 156 | 161 |
| MI (295 C., 6.7 kg) | D1238 | ° C. | 1.29 | 1.77 | 1.4 | | 2.45* |
| Sp Gr | D792 | — | 1.37 | 1.36 | 1.37 | 1.37 | 1.36 |

TABLE 10B

| TEST | ASTM | Unit | Example 11 | Example 12 | Example 13 | Example 14 | Comparative Example 3 |
|---|---|---|---|---|---|---|---|
| Flexural Modulus | D790 | MPa | 2558 | 2703 | 2834 | 3006 | 2551 |
| Flexural Strength | D790 | MPa | 74 | 78 | 107 | 112 | 112 |
| Tensile Modulus | D638 | MPa | 2668 | 2779 | 2813 | 3833 | 2372 |
| Tensile Strength | D638 | MPa | 55 | 51 | 69 | 70 | 81 |
| Impact Strength (N) | D256 | J/m | 91 | 77 | 94 | 64 | 315 |
| Impact Strength (RN) | D256 | J/m | 862 | 361 | 1794 | 1053 | 2143 |
| HDT (0.45 MPa) | D648 | ° C. | | | | | |
| HDT (1.82 MPa) | D648 | ° C. | 127 | 121 | 142 | 145 | 161 |
| MI (295 C., 6.7 kg) | D1238 | ° C. | 1.78 | — | 1.8 | — | 2.45* |
| Sp Gr | D792 | — | 1.35 | 1.32 | 1.37 | 1.38 | 1.36 |

*Melt Index of Comparative Example 3 was done at the test conditions-(337 C., 6.7 kg)

Mechanical property such as tensile, flexural, HDT and Izod impact are listed in Tables 10 A and 10B. Comparative Example 3 represents some properties the indicated polyetherimide/polycarbonate blend can achieve. Although the polyetherimide/polycarbonate blend of Comparative Example 3 achieved some useful properties, it did not exhibit the UV resistance that articles molded from our composition exhibited (it did not exhibit a UV resistance of ΔE ranging from more than 0 to less than or equal to 10 units after exposure to ultraviolet light for 300 hours, per ASTM D-4459 protocol.)

The composition Example 8 containing Polycarbonate A/B and PEI, maintained good mechanical properties such as tensile, flexural, good Izod impact and flow properties as shown in Table. Mechanical properties of Example 1 were already described previously. Example 1 which contains UV stabilizer compares well in properties Vs. Example 8 (no UV stabilizer).

Notched Impact strength was ~30% lower for Example 1 Vs. 8. One possible reason for this might be due to the higher loading levels of TiO2 pigment for Example 1 Vs. 8. In the case of composition example 9—upon increasing the Ultem polyetherimide component and consequently lowering the polycarbonate A/B component, the notched impact properties were reduced by approximately 30%.

Similarly Example 10 is the UV stabilized version of Example 9 and here one can see similar mechanical properties to Example 9. In Examples 11, the Polycarbonate C was replaced by Polycarbonate D and the mechanical properties are shown in Table. Mechanical properties were comparable to Examples 8-10 however impact properties are lower down to 91 MPa (Notched-Izod). Example 12 is the UV stabilized version of Example 11 and the mechanical properties are comparable and similar to Example 11. One can also notice lower HDT for Examples 11 and 12 due to the Polycarbonate D which contains siloxane copolymer. In the case of composition example 13—upon increasing the Ultem polyetherimide component and consequently lowering the polycarbonate D component, the mechanical properties are similar to Examples 11 and 12, but the HDT increases. This can be alluded to the higher PEI content which gives rise to higher HDT. All other properties are comparable. Finally Example 14 is the UV stabilized version of Example 13 and here the properties are similar to Example 13 as expected. Comparative Example 3 is shown for comparing mechanical properties with the invention examples 1, 8-14. Comparative Example 3 has good mechanical properties including tensile, flexural, impact, HDT and flow properties.

The composition used in Comparative Example 3 also maintained good mechanical properties such as tensile, flexural, very good Izod impact and flow properties as shown below in Table. I This resin composition yielded very high impact properties, similar to the composition used in invention Example 4 and also had good flow properties.

The overall good colorability, significantly improved UV performance and well maintained physical properties at the same time, not achievable by good polyetherimide/polycarbonate blend as Comparative Example 3, offers the inventive blends great advantages to applications where color aesthetics and UV stability are most critical parameters to product designers, especially in consumer electronic market, since color is the first to see by consumers every day. The broader resin blend flexibility along with different levels of UV stability improvements of the invention offers electronic product designers wide choices when cost and benefits becomes a factor in material selection. Though inventive examples show drops in HDT versus Comparative Example 3, they are well above the acceptable range for consumer electronics' applications, especially hand held devices since heat generation by battery operated hand held device is much limited.

Example 2 & Comparative Example 4-5

Table 11 is compositions of inventive Example 2 and Comparative Example Examples 3,4,5. The compositions were extruded and molded ASTM parts for physical properties testing and comparison. The purpose of these examples were to demonstrate inventive compositions outstanding performance as a combination of Mechanical properties such as Tensile properties, flexural properties, impact properties and flow properties as well as UV exposure resistance and chemical resistance to a wide range of chemicals, upon comparison with Comparative Example 4 (100% Polycarbonate A), Comparative Example 5 (100% Polyetherimide) and Comparative Example 3 (Polycarbonate C—Polyetherimide A blend) Each composition represents a white color and comparisons are made on white color packages that includes TiO2, carbon black, S.R.52 and P.B.28.

TABLE 11

Composition for Example 2 & Comparative Example 4-5

| Name | Example 2 | Comparative Example 4 | Comparative Example 5 | Comparative Example 3 |
|---|---|---|---|---|
| Polyetherimide A | 33.900 | — | 100.000 | 33.900 |
| Siloxaane Polyetherimide | 6.000 | — | — | 6.0000 |
| Polycarbonate A | 56.8800 | 97.000 | — | — |
| Polycarbonate B | 3.0000 | 3.000 | — | — |
| Polycarbonate C | — | — | — | 60.000 |
| UV Stabilizer A | 0.1200 | — | — | — |
| TiO2 | 18.6600 | 2.000 | — | 16.7580 |
| S.R.52 | 0.00166 | — | — | 0.0006 |
| S.V.13 | 0.00084 | — | — | 0.00170 |
| P.B.28 | 0.0720 | — | — | 0.0900 |
| UV Stabilizer B | 4.0000 | — | — | — |

Table 12A shows the summary of desired properties listed in the claims of this patent for compositions listed in Table 11

| TEST | ASTM | Unit | Example 2 | Comparative Example 4 | Comparative Example 5 | Comparative Example 3 |
|---|---|---|---|---|---|---|
| — | — | — | | | | |
| Flexural Modulus | D790 | MPa | 3192 | 2340 | 3510 | 2510 |
| Flexural Strength | D790 | MPa | 117 | 93 | 165 | 112 |
| Tensile Modulus | D638 | MPa | 3054 | 2380 | 3580 | 2580 |
| Tensile Strength | D638 | MPa | 71 | 62 | 110 | 74 |
| Impact Strength (N) | 0256 | J/m | 341 | 907 | 53 | 315 |
| Impact strength (RN) | D256 | J/m | 1576 | — | 1335 | 2143 |
| HDT (0.45 MPa) | D648 | ° C. | — | 137 | 210 | — |
| HDT (1.82 MPa) | D648 | ° C. | 130 | 132 | 201 | 160 |
| Chemical Resistance | — | — | V. Good | Poor | Excellent | V. Good |
| Flow properties | — | — | V. Good | Excellent | Fair | V. Good |
| Colorability | — | — | V. Good | Excellent | Poor | V. Good |
| UV stability | — | — | V. Good | Fair | V. Good | Poor |

In the Table 12A shown above, it can be seen that Comparative Example 4 shows good mechanical properties such as tensile and flexural properties and outstanding impact properties, has good colorability to light colors but has poor UV stability as per predefined exposure conditions and poor chemical resistance to some of the chemicals listed in this patent as shown in Table 12B.

Comparative Example 5 shows very good mechanical properties such as tensile and flexural properties, reasonable impact, outstanding chemical resistance to the chemicals listed. However, the composition of Comparative Example 5 exhibited poor flow properties, and very poor colorability to light color, which means that the article of Comparative Example 5 could not even be colored to the desired white color that can be achieved by our composition Comparative Example 3 shows good mechanical properties such as tensile, flexural properties, excellent impact properties and flow properties, very good chemical resistance to the chemicals listed. However, the article and compositions used in Comparative Example 3 had poor UV stability (did not exhibit a UV resistance of ΔE ranging from more than 0 to less than or equal to 10 units after exposure to ultraviolet light for 300 hours, per ASTM D-4459 protocol)

Therefore, the compositions used in comparative Example 3,4,5 have some good properties and some poor properties but none have a combination of all the desired properties.

Invention Example 12 has an excellent combination of the above properties i.e. good mechanical properties such as tensile, flexural properties, excellent impact and flow properties, very good chemical resistance to the chemicals listed and very good UV stability. Such an invention example exhibits a rare and extraordinary combination of properties as shown in Table 12A.

A Summary of our results discussed in this application is given here in a summarized Table 12B and paragraph description below.

TABLE 12B

Chemical Resistance to Listed Chemical Agents

| Grade Chemicals | Duration of Exposure | Strain level(%) | Example 2 Yield Strength | Example 2 Nominal Strain at Break | Comparative Example 4 Yield Strength | Comparative Example 4 Nominal Strain at Break | Comparative Example 5 Yield Strength | Comparative Example 5 Nominal Strain at Break | Comparative Example 3 Yield Strength | Comparative Example 3 Nominal Strain at Break |
|---|---|---|---|---|---|---|---|---|---|---|
| Olive | 1 day | 0 | 100% | 100% | — | — | 101% | 97% | 102% | 96% |
| Oil | 1 day | 0.5 | 101% | 89% | — | — | 105% | 105% | 101% | 110% |
| | 1 day | 1 | 100% | 98% | 101% | 85% | 112% | 100% | 99% | 111% |
| Banana | 1 day | 0 | 100% | 100% | 100% | 96% | 103% | 101% | 102% | 103% |
| Boat | 1 day | 0.5 | 100% | 135% | 100% | 87% | 99% | 90% | 101% | 80% |
| Sunscreen SPF-30 | 1 day | 1 | 100% | 97% | 0% | 0% | 98% | 99% | 100% | 100% |
| Purell | 1 day | 0 | 100% | 100% | — | — | 99% | 99% | 100% | 99% |
| Hand Sanitizer | 1 day | 0.5 | 101% | 82% | — | — | 115% | 105% | 101% | 80% |
| Sebum | 1 day | 0 | 100% | 100% | — | — | 95% | 102% | 100% | 100% |
| | 1 day | 0.5 | 102% | 84% | 101% | 82% | 106% | 98% | 101% | 89% |
| | 1 day | 1 | 101% | 84% | 98% | 6% | 111% | 100% | 101% | 97% |
| 70% Sulphuric Acid | 120 minutes | 0 | 100% | 86% | 52% | 49% | 108% | 114% | 100% | 119% |

Table 12B shows the Examples according to the invention and Comparative Examples that use various chemicals for compositions listed in Table 11.

Our results show that articles made from our composition had polyetherimide component and the polycarbonate component in sufficient amount for the composition to exhibit a combination of flow properties, chemical resistance properties, and ultraviolet resistance properties commensurate with our invention. More particularly, articles from our invention exhibited a melt index ranging from 2 to 4 g/min, at a temperature of 295 C and a load of 6.7 kg, sufficient to enable the composition to be molded into a cavity having a dimension that is more than 0 and less than <1 mm. The article had an impact strength that is more than or equal to 30 Rm. With respect to chemical resistance, articles made from our composition exhibited a strength retention of at least 50% when the article is immersed in a chemical selected from the group of an acid solution having an acid concentration ranging from 20 to 70%, the acid solution selected from the group of sulfuric acid, nitric acid, phosphoric acid, formic acid, acetic acid, and combinations thereof, at a temperature of 23 C and strain level selected from the group of 0%, 0.5%, 1%, and combinations thereof, for a period of 2 or 24 hours. With respect to the ultraviolet resistance, articles made from our composition exhibited a resistance to ultraviolet light exposure of ΔE ranging from 4 to 10 units, per ASTM D-4459 protocol after the article is exposed to ultraviolet light for 300 hours.

Comparison in table is made to polycarbonate A, legacy polyetherimide B and a failure example of the blend of polycarbonate-ester copolymer-polyetherimide and lastly the invention example of our new polycarbonate homopolymer-polyyetherimide blend Example 4 that has a rare unique combination of good mechanical properties, processability (at polycarbonate conditions), chemical resistance, flow properties, colorability and UV stability. This combination of stringent properties is rare and we do not know of other materials that can perform all of the above requirements commensurate with the scope of our invention.

Example 15-19 and Comparative Example I

The purpose of Examples 2 and 15-19 in Table 13 was to demonstrate suitable UV stabilizers. Comparisons were made on the same base white color formulation. UV exposures were tested per ASTMD4459 on 2"×3" color plaques made according to the extrusion and molding procedures set forth before. Initial UV stabilizers were loaded at 4 pph (parts-per-hundred). After extrusion, UV stabilizer retained in each formulation were analyzed by GC and reported as weight percentage for retention calculated based on initial loading. Example 17 containing UV stabilizer E (dimethyl succinate polymer with 4-hydroxy-2,2,6,6,-tetramethyl-1-piperidineethanol) was not extrudable because the UV Stabilizer E, was decomposed under extrusion temperature causing foaming strand. Example 2, 15, 16, 18 & 19 show above 84% retention, suggesting that UV stabilizer B, C, D, F & G are heat stable under resin processing temperature. As results, each Example shows reduced DE* versus the Comparative Example 1 after 300 hrs exposure representing UV stability improvement of 35.35%, 30.16%, 25.96%, 33.26% and 38.47% respectively after 300 hours exposure.

Impact of yellow nature of UV stabilizers on initial white color were evaluated and the results are shown in Table 13. Although they did not impact L* values much, b* values of each initial white color were affected, making the whites yellower at various degree versus the Comparative Example 1 as b* values increase. UV stabilizer B, C, D as shown in Example 2, 15 & 16 are much more preferred, as they have negligible initial color change, than UV stabilizer G & F as they significantly alter initial color, although they are all heat stable under high processing temperature, have excellent retention and improve UV stability of resin-color compositions.

TABLE 13

| | | Comparative Example 1 | Example 2 | Example 15 | Example 16 | Example 18 | Example 19 | |
|---|---|---|---|---|---|---|---|---|
| Formulation | Polyetherimide A | 33.900 | 33.900 | 33.900 | 33.900 | 33.900 | 33.900 | |
| | Siloxaane Polyetherimide | 6.0000 | 6.0000 | 6.0000 | 6.0000 | 6.0000 | 6.0000 | |
| | Polycarbonate A | 56.8800 | 56.8800 | 56.8800 | 56.8800 | 56.8800 | 56.8800 | |
| | Polycarbonate B | 3.0000 | 3.0000 | 3.0000 | 3.0000 | 3.0000 | 3.0000 | |
| | UV Stabilizer A | 0.1200 | 0.1200 | 0.1200 | 0.1200 | 0.1200 | 0.1200 | |
| | $TiO_2$ | 18.6600 | 18.6600 | 18.6600 | 18.6600 | 18.6600 | 18.6600 | |
| | S.R.52 | 0.00166 | 0.00166 | 0.00166 | 0.00166 | 0.00166 | 0.00166 | |
| | S.V.13 | 0.00084 | 0.00084 | 0.00084 | 0.00084 | 0.00084 | 0.00084 | |
| | P.B.28 | 0.0720 | 0.0720 | 0.0720 | 0.0720 | 0.0720 | 0.0720 | |
| | UV Stabilizer B | | 4.0000 | | | | | |
| | UV Stabilizer C | | | 4.0000 | | | | |
| | UV Stabilizer D | | | | 4.0000 | | | |
| | UV Stabilizer F | | | | | | 4.0000 | |
| | UV Stabilizer G | | | | | | | 4.0000 |
| Analytical Data | Initial loading (%) | | 3.37 | 3.37 | 3.37 | 3.37 | 3.37 | 3.37 |
| | Analytical (%) | 0 | 2.95 | 3.08 | 3.23 | NA | 2.84 | 3.02 |
| | Retention after extrusion (%) | | 87.54% | 91.43% | 95.88% | NA | 84.30% | 89.64% |
| UV Exposure (DE*) | 300 Hrs | 9.59 | 6.20 | 6.70 | 7.10 | NA | 6.40 | 5.90 |
| UV Stability Improvement | 300 hrs | | 35.35% | 30.16% | 25.96% | NA | 33.26% | 38.47% |
| Initial Color | L* | 92.19 | 91.21 | 91.97 | 91.76 | NA | 90.67 | 91.70 |
| | a* | −0.99 | −1.21 | −0.92 | −1.27 | NA | −0.69 | −2.00 |
| | b* | −0.69 | 0.42 | −0.71 | 0.29 | NA | 3.83 | 1.51 |

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A composition comprising:

at least 15 wt. % of a polyetherimide other than a polyetherimide siloxane copolymer;

at least 35 wt. % of a polycarbonate siloxane copolymer;

polyetherimide siloxane copolymer; and optionally, at least one UV stabilizer, wherein the composition exhibits a UV resistance of ΔE ranging from more than 0 to less than or equal to 10 units after exposure to ultraviolet light for 300 hours, per ASTM D-4459 protocol.

2. The composition of claim 1, wherein the polyetherimide is a homopolymer.

3. The composition of claim 1, wherein the weight ratio of polycarbonate to polyetherimide provides the composition with a melt index ranging from 1.5 to 6 gi/min., at 295° C. and at a loading level of 6.7 kg, wherein the melt index is sufficient to enable the composition to be molded into a cavity having a dimension greater than 0 and less than or equal to 3 mm.

4. The composition of claim 3, wherein the melt index is sufficient to enable the composition to be molded into a cavity having a. dimension greater than 0 and less than or equal to 1 mm.

5. The composition of claim 1 wherein the polycarbonate is present in an amount of at least 50 wt. %.

6. The composition of claim 1, wherein the polycarbonate siloxane copolymer is poly(carbonate-ester-siloxane).

7. The composition of claim 1, wherein the weight ratio of polycarbonate to polyetherimide is from 2:5 to 4:5, with the proviso that the total weight of the composition does not exceed 100%.

8. The composition of claim 7, wherein the impact strength is greater than 50 J/m.

9. The composition of claim 1, further comprising a phosphorus stabilizer in an amount of between 0.1-10 wt. %.

10. The composition of claim 1, having a tensile modulus of elasticity (MPa) of from 2800 MPa to 3300 MPa.

11. The composition of claim 1, wherein the tensile elongation at yield ranges from 2% to 20%.

12. The composition of claim 1, wherein the tensile elongation at break ranges from 1% to 80%.

13. The composition of claim 1, wherein the tensile stress at yield ranges from 55 MPa to 80 Mpa.

14. The composition of claim 1, wherein an article, shaped by molding or extruding the composition, has an impact strength that is at least 30 J/m.

15. The composition of claim 1, having a natural resin color that its chromiticity C* has low variation less than 12 units when a viewing angle changes from 15° to 110°, based on the angle of observation.

16. The composition of claim 1, wherein the composition does not contain a colorant and the hue angle of the composition varies by less than 5° based on a viewing angle change in a range of from 15° to 110°.

17. The composition of claim 1, further comprising a colorant.

18. The composition of claim 17, wherein the colorant is one selected from the group consisting of a pigment, a dye, and combinations thereof.

19. The composition of claim 17, wherein the colorant is present in an amount greater than 0 to 50%.

20. The composition of claim 17, wherein the colorant is at least one selected from the group consisting of organic colorants, inorganic colorants, and combinations thereof.

21. The composition of claim 17, wherein the colorant is at least one selected from the group consisting of titanium dioxide, carbon black, and combinations thereof.

22. The composition of claim 17, having a color selected from the group consisting of white, light gray, and combinations thereof, exhibiting an L,* value greater than or equal to 80, and comprising less than 50 pph of titanium dioxide.

23. The composition of claim 22, comprising less than 50 pph of titanium dioxide.

24. The composition of claim 17, haying a color selected from the group consisting of gray, black, and combinations thereof;

wherein the color has an L* value of below 80; and wherein the composition comprises at least 0.001 pph of carbon black.

25. An article comprising the composition of claim 1.

26. The article of claim 25, wherein the article is a molded article.

27. The article of claim 26, wherein the article is machined.

28. The article of claim 25, wherein the article is selected from the group consisting of films, fibers, foams, and combinations thereof.

29. The composition of claim 1, wherein an article, comprising the composition and shaped by one selected from the group consisting of molding, extruding, and combinations thereof, exhibits a strength retention of at least 50% when immersed in an acid solution for a period of <1 or >24 hours at a temperature of about 23° C. and at a strain level selected from the group consisting of 0%, 0.5%, 1.0%, and combinations thereof;

wherein the acid solution is selected from the group consisting of sulfuric acid, nitric acid, phosphoric acid, formic acid, acetic acid, and combinations thereof, and wherein the acid solution has a concentration of at least 20%.

30. The composition of claim 29, wherein the acid solution has a concentration of less than 70%.

31. The composition of claim 1, wherein an article molded or extruded from the composition exhibits a strength retention of at least 50%, and combinations thereof; when the article is immersed, for a period ranging from 1 minute to <1 hr or up to 24 hours, in a chemical reagent component selected from the group consisting of olive oil, banana boat sunscreen SPF-30, Purell Hand Sanitizer, sebum (naturally secreted oil by the skin), and combinations thereof at a temperature of 23 C.

32. The composition of claim 31, wherein the article that is extruded or molded from the composition has a strain level selected from the group of 0%, 0.5%, 1% when it is immersed in the chemical reagent component.

33. The composition of claim 1, wherein at least 70% of the stabilizer is retained in the composition when the composition is extruded into a pellet at a die temperature ranging from 600F-620F.

34. The composition of claim 1, wherein the stabilizer is present in an amount ranging from more than 0.5 wt % to 15 wt %.

35. The composition of claim 1, wherein the UV stabilizer is present in an amount ranging from more than 0.5 wt % to 15 wt %.

36. The composition of claim 1, wherein the polyetherimide is a thermoplastic resin composition comprising;

(a) a polyetherimide resin; and, (b) a phosphorous-containing stabilizer, in an amount that is effective to increase the melt stability of the polyetherimide resin, wherein the phosphorous-containing stabilizer exhibits a low volatility, such that, as measured by thennogravinietric analysis of an initial amount of a sample of the phosphorous-containing stabilizer, greater than or equal to 10 percent by weight of the initial amount of the sample remains unevaporated upon heating of the sample from room temperature to 300° C. at a heating rate of 20° C. per minute under an inert atmosphere.

37. A process for producing a shaped article, the process comprising shaping a composition comprising:

at least 15 wt. % of a polyetherimide;

at least 35 wt. % of a polycarbonate siloxane copolymer;

polyetherimide siloxane; and optionally, at least one UV stabilizer, wherein the composition exhibits a UV resistance of ΔE ranging from more than 0 to less than or equal to 10 units after exposure to ultraviolet light for 300 hours, per ASTM D-4459 protocol;

wherein the shaping is one selected from the group consisting of injection molding, compression molding, extrusion, film shaping, machining, and combinations thereof.

38. The process of claim 37, comprising extruding the composition and recovering a shaped article.

39. The process of claim 37, comprising injection molding the composition into a cavity having a dimension greater than 0 and less than or equal to 3 mm.

40. The process of claim 39, wherein the cavity has a dimension of greater than 0 and less than 1 mm.

41. A shaped article produced by the process of claim 37.

42. A process for producing a shaped article, the process comprising shaping a composition comprising:

at least 15 wt. % of a poiyetherimide;

at least 35 wt. % of a polycarbonate;

a polyetherimide siloxane; and optionally, at least one UV stabilizer, wherein the composition exhibits a UV resistance of ΔE ranging from more than 0 to less than or equal to 10 units after exppsure to ultraviolet light for 300 hours, per ASTM D-4459 protocol, wherein the shaping comprises injection molding the composition in a cavity, wherein a substrate is placed into the cavity before the composition is injection molded into the cavity and the composition adheres to the substrate.

43. The process of claim 42, wherein the substrate is a metal.

44. The process of claim 43, wherein the metal is selected from the group consisting of aluminum, copper, steel, and combinations thereof.

45. The article of claim 44, wherein the article is a component of an electronic device.

46. The article of claim 45, wherein the electronic device is selected from the group consisting of personal computers, telephones, digital cameras, Global Positioning System (GPS) devices, music players, video players, video displays, and combinations thereof.

47. A composition comprising:

at least 15 wt. % of at least one polyctherimide;

at least 35 wt. % of at least one polycarbonate siloxane copolymer:

at least one polyetherimide siloxane;

at least one UV stabilizer; and at least one colorant, wherein the composition exhibits a UV resistance of ΔE ranging from more than 0 to less than or equal to 10 units after exposure to ultraviolet light for 300 hours, per ASTM D-4459 protocol;

wherein the composition has a color selected from the group consisting of gray, black, white, light gray, and combinations thereof, wherein both the gray color and the black color exhibit an L* value of below 80;

wherein, when the composition has either the gray color or the black color, the at least one colorant comprises at least 0.001 pph of carbon black;

wherein both the white color and the light gray color exhibit an L* value greater than or equal to 80;

wherein, when the composition has either the white color or the light gray color, the at least one colorant comprises less than 50 pph of titanium dioxide;

wherein the weight ratio of polycarbonate to polyetherimide provides the composition with a melt index ranging from 1.5 to 6 g/min., at 295° C. and at a loading level of 6.7 kg;

wherein the melt index is sufficient to enable the composition to be molded into a cavity having a dimension of greater than 0 and less than or equal to 3 mm;

wherein an article, comprising the composition and shaped by one selected from the group consisting of molding, extruding, and combinations thereof, exhibits a strength retention of at least 50% when immersed in an acid solution for a period of <1 upto 24 hours at a temperature of about 23° C. and at a strain level selected from the group consisting of 0%, 0.5%, 1.0%, and combinations thereof;

wherein the acid solution is selected from the group consisting of sulfuric acid, nitric acid, phosphoric acid, formic acid, acetic acid, and combinations thereof, and wherein the acid solution has a concentration of at least 20%.

48. The composition of claim 47, wherein an article molded or extruded from the composition exhibits a strength retention of at least 50%, and combinations thereof; when the article is immersed, for a period ranging from 1 minute to <1 hr or up to 24 hours, in a chemical reagent component selected from the group consisting of olive oil, banana boat sunscreen SPF-30, Purell Hand Sanitizer, sebum (naturally secreted oil by the skin), and combinations thereof at a temperature of 23 C.

49. The composition of claim 48, wherein the article that is extruded or molded from the composition has a strain level selected from the group of 0%, 0.5%, 1% when it is immersed in the chemical reagent component.

50. The composition of claim 47, wherein at least 70% of the stabilizer is retained in the composition when the composition is extruded into a pellet at a die temperature ranging from 600F-620F.

* * * * *